(12) United States Patent
Hori

(10) Patent No.: US 8,194,948 B2
(45) Date of Patent: Jun. 5, 2012

(54) INSTRUMENTATION ENDOSCOPE APPARATUS

(75) Inventor: Fumio Hori, Tokyo (JP)

(73) Assignee: Olympus Corporation, Tokyo (JP)

( * ) Notice: Subject to any disclaimer, the term of this patent is extended or adjusted under 35 U.S.C. 154(b) by 1087 days.

(21) Appl. No.: 12/011,740

(22) Filed: Jan. 29, 2008

(65) Prior Publication Data

US 2008/0240491 A1 Oct. 2, 2008

(30) Foreign Application Priority Data

Jan. 31, 2007 (JP) ............................... P2007-020906
Jul. 3, 2007 (JP) ............................... P2007-175158

(51) Int. Cl.
*G06K 9/22* (2006.01)

(52) U.S. Cl. ........ 382/128; 382/130; 382/131; 382/132; 128/920; 128/922; 128/923; 700/125; 700/135; 702/117; 702/118; 702/119

(58) Field of Classification Search .................. 382/100, 382/128, 130, 131, 132; 128/920, 922, 923; 700/125, 135; 702/108, 117, 118, 119
See application file for complete search history.

(56) References Cited

U.S. PATENT DOCUMENTS

| | | | | |
|---|---|---|---|---|
| 5,140,265 | A * | 8/1992 | Sakiyama et al. | ............ 324/220 |
| 6,215,914 | B1 | 4/2001 | Nakamura et al. | |
| 6,640,002 | B1 | 10/2003 | Kawada | |
| 2004/0247171 | A1 | 12/2004 | Hashimoto et al. | |
| 2006/0042104 | A1* | 3/2006 | Donaldson et al. | ........... 33/1 BB |
| 2006/0193533 | A1* | 8/2006 | Araki et al. | .................. 382/275 |
| 2007/0067131 | A1* | 3/2007 | Teshima et al. | ............... 702/118 |
| 2007/0147676 | A1 | 6/2007 | Sasai | |
| 2008/0292055 | A1 | 11/2008 | Boone | |
| 2009/0092278 | A1 | 4/2009 | Doi et al. | |

FOREIGN PATENT DOCUMENTS

| | | |
|---|---|---|
| JP | 04-198741 A | 7/1992 |
| JP | 09-281055 A | 10/1997 |
| JP | 2004-049638 | 2/2004 |
| JP | 2005-204724 A | 8/2005 |

OTHER PUBLICATIONS

Related U.S. Appl. No. 12/011,741, filed Jan. 29, 2008; Inventors: Takahiro Doi et al; Title: Endoscope Apparatus and Program.
Office Action dated Oct. 4, 2011 issued in related U.S. Appl. No. 12/011,741.
Japanese Office Action dated Feb. 28, 2012 and English translation thereof in counterpart Japanese Application No. 2007-175159.
Notice of Allowance mailed Feb. 16, 2012 in related U.S. Appl. No. 12/011,741.

* cited by examiner

*Primary Examiner* — David A Vanore
*Assistant Examiner* — Nicole Ippolito
(74) *Attorney, Agent, or Firm* — Holtz, Holtz, Goodman & Chick, PC

(57) ABSTRACT

A reference point-designating section 18*b* designates two reference points on a measurement object. A reference curve-calculating section 18*c* calculates a reference curve calculated by approximating an outline of the measurement object based on the reference points. A loss-composing point-calculating section 18*d* calculates loss-composing points constituting a loss outline formed on the measurement object based on the reference points and the reference curve. A loss size-calculating section 18*f* measures loss size based on the loss-composing points. Designating two reference points enables loss size measurement, thereby reducing complex operation and improving operability.

8 Claims, 28 Drawing Sheets

INSTRUMENTATION ENDOSCOPE APPARATUS

BACKGROUND OF THE INVENTION

1. Field of the Invention

The present invention relates to an endoscope apparatus that conducts measurement processing on a measurement object based on images picked up by an electronic endoscope.

The present application claims priority to Japanese Patent Application No. 2007-020906 filed on Jan. 31, 2007, and Japanese Patent Application No. 2007-175158 filed on Jul. 3, 2007, the details of which are incorporated herein.

2. Background Art

Sometimes, turbine blade edges or compressor blade edges of gas turbines mainly used in aircraft are subject to losses due to foreign bodies. The size of loss is a decision-making factor of blade replacement, so its inspection is very important. Under this circumstance, conventional endoscope apparatuses approximated loss edges of turbine blades or compressor blades by virtual curves and virtual points and measured loss sizes based on the approximated virtual curves and points (see, cf. Patent Document 1).

Patent Document 1: Japanese Patent Application Laid-open No. 2005-204724.

However, parametric curves used to approximate loss edges in conventional methods necessitated the designating of at least three points to calculate a virtual curve and to change the edge shape by adjusting the calculated virtual curve manually, thereby requiring complex operations. Also, designation of at least four reference points due to edge losses formed on corners of measurement objects approximated by a virtual curve and virtual points formed on the curve necessitated complex operation.

SUMMARY OF THE INVENTION

The present invention was conceived in consideration of the aforementioned problems, and an object thereof is to provide an endoscope apparatus that can reduce complex operations and improve operability.

The present invention enables loss size measurement upon designating two reference points, thereby obtaining effects of reducing complex operations and improving operability.

PREFERRED EMBODIMENTS

Figure 1:
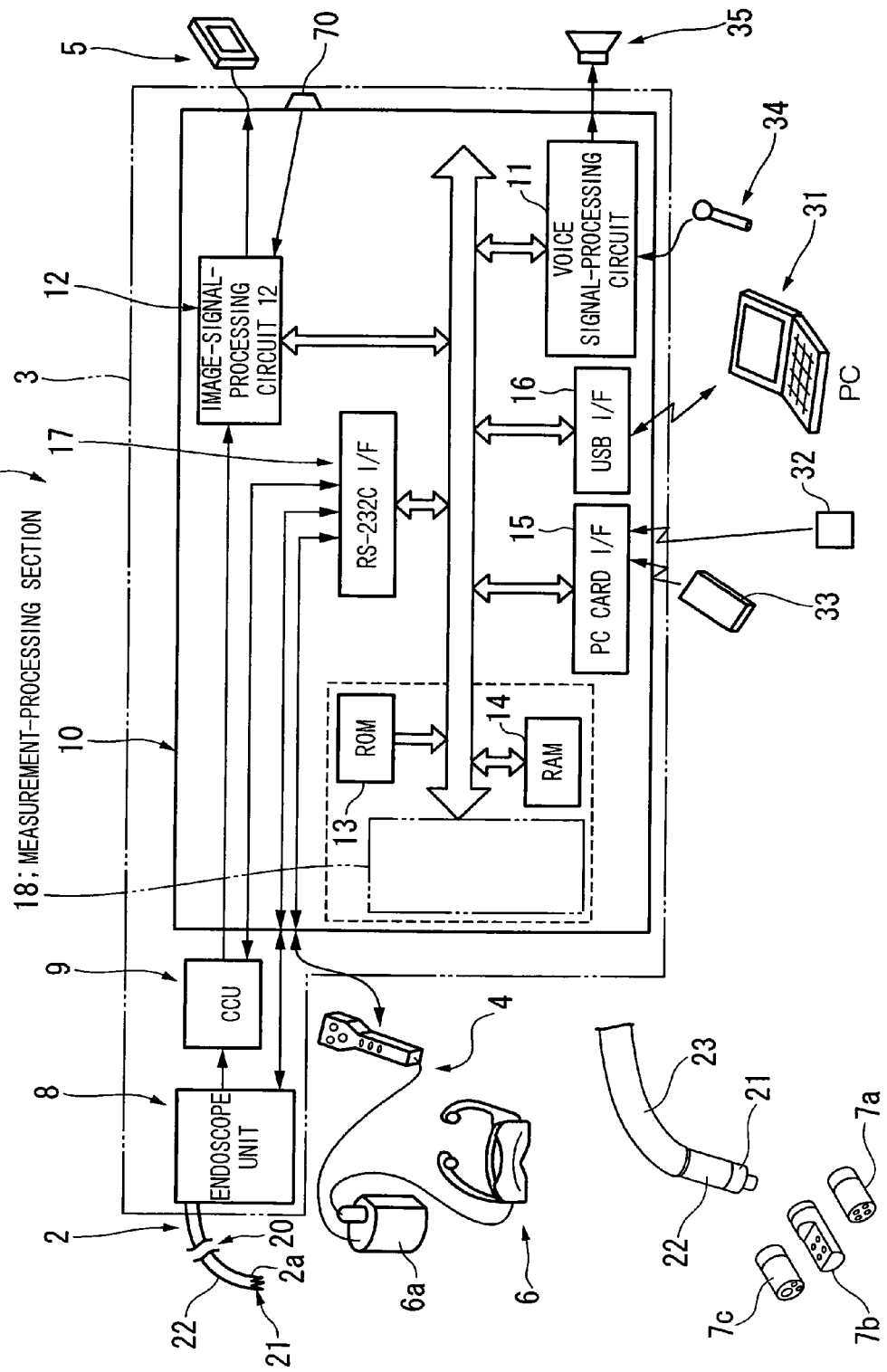
FIG. 1 is a block diagram showing a configuration of an endoscope apparatus according to a first embodiment of the present invention.

Embodiments of the present invention are explained in detail with reference to drawings as follows. In the following embodiments, "area" indicates the extent or measurement of a surface in mathematic meaning; and "region" indicates a mere space or section free from the mathematic meaning. FIG. 1 shows the configuration of an endoscope apparatus 1 according to an embodiment of the present invention. The endoscope apparatus 1 according to the present embodiment as shown in FIG. 1 includes: an endoscope 2; a control unit 3; a LCD monitor 5; a face mount display (FMD) 6; an FMD adapter 6a; optical adapters 7a, 7b, and 7c; an endoscope unit 8; a camera-control unit 9; and a control unit 10.

The endoscope 2 (electronic endoscope) for picking up a measurement object and generating an image signal has an elongate insertion tube 20. Formed consecutively to the insertion tube 20 in order from the distal end are: a hard distal end section 21; a bending section 22 that is capable of freely bending in, e.g., horizontal and vertical directions; and a flexible tube section 23 having flexibility. The proximal end of the insertion tube 20 is connected to the endoscope unit 8. The distal end section 21 is configured to allow various optical adapters to screw therewith detachably, e.g., the stereo optical adapters 7a and 7b having two observational perspectives, or the ordinary observation optical adapter 7c having an observational perspective.

Provided in the control unit 3 are the endoscope unit 8; an image-processing unit, i.e., the camera-control unit (hereinafter called the CCU) 9; and a control unit, i.e., the control unit 10. The endoscope unit 8 is provided with a light source apparatus that supplies illumination light necessary for observation; and a bending apparatus that bends the bending section 22 constituting the insertion tube 20. An image signal output from a solid image-pickup device 2a built in a distal end section 21 of the insertion tube 20 and input to the CCU 9 is converted into an image signal, e.g., an NTSC signal and supplied to the control unit 10.

The control unit 10 is constituted by a voice signal-processing circuit 11; an image-signal-processing circuit 12; a ROM 13; a RAM 14; a PC card interface (hereinafter called a PC card I/F) 15; a USB interface (hereinafter called a USB I/F) 16; an RS-232C interface (hereinafter called an RS-232C I/F) 17; and a measurement-processing section 18.

Supplied to the voice signal-processing circuit 11 is a voice signal collected by a microphone 34; a voice signal obtained by re-playing data stored in a storage medium, e.g., a memory card; or a voice signal generated by the measurement-processing section 18. The image-signal-processing circuit 12 carries out a process of synthesizing the image signal supplied from the CCU 9 with a display signal for use in an operation menu generated by operating the measurement-processing section 18 in order to display synthesized image including an endoscopeally obtained image supplied from the CCU 9 and the graphic operation menu. In addition, the image-signal-processing circuit 12 upon providing predetermined processes to the synthesized image signal supplies the processed signal to the LCD monitor 5 in order to display an image on the screen of the LCD monitor 5.

The PC card I/F 15 provides free installation and removal of memory cards (storage medium) thereto, e.g., a PCMCIA memory card 32 or a flash memory card 33. Attaching the memory card thereto and controlling the measurement-processing section 18 enable capturing of control-processing information or image information stored in the memory card and storing of the control-processing information or the image information in the memory card.

The USB I/F 16 is an interface that provides electrical connection between the control unit 3 and a personal computer 31. Electrical connection between the control unit 3 and the personal computer 31 via the USB I/F 16 allows the personal computer 31 to supply various commands regarding display of an endoscopeally obtained image and regarding control including image-processing during measurement. In addition, this enables input and output of various processing information and data between the control unit 3 and the personal computer 31.

Connected to the RS-232C I/F 17 are the CCU 9; the endoscope unit 8; and a remote controller 4 that provides commands to control the CCU 9 and to move the endoscope unit 8, etc. The remote controller 4, upon carrying out a user's command, commences communication required to control operations of the CCU 9 and the endoscope unit 8 based on the details of the operation.

Figure 2:
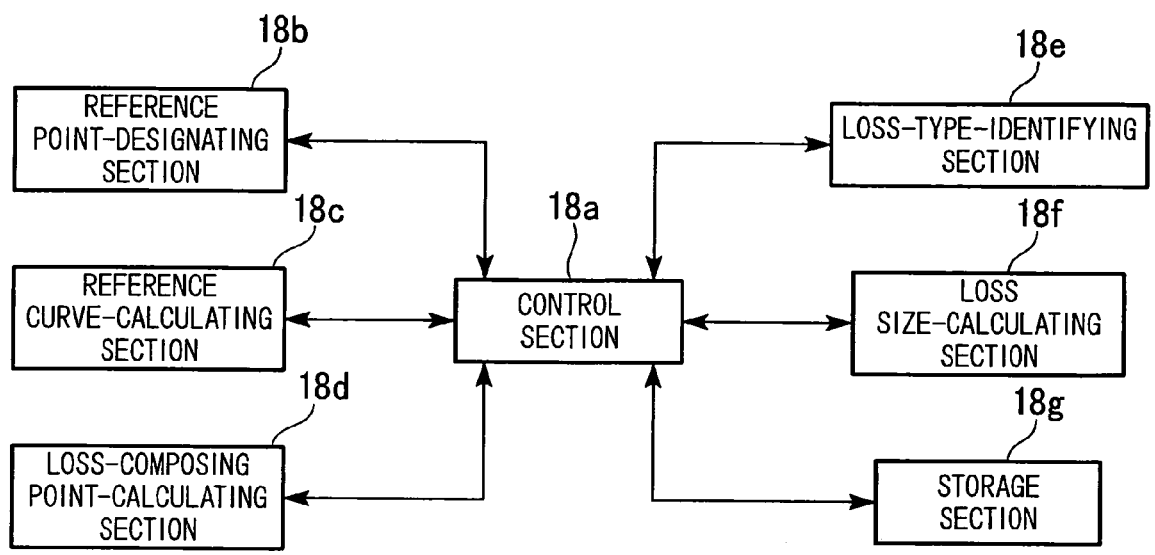
FIG. 2 is a block diagram showing a configuration of a measurement-processing section provided with the endoscope apparatus according to a first embodiment of the present invention.

FIG. 2 illustrates the configuration of the measurement-processing section 18. As illustrated in FIG. 2, the measurement-processing section 18 is constituted by: a control section 18a; a reference point-designating section 18b; a reference curve-calculating section 18c; a loss-composing point-calculating section 18d; a loss-type-identifying section 18e; a loss size-calculating section 18f; and a storage section 18g.

The control section 18a (control unit) controls components in the measurement-processing section 18. In addition, the control section 18a has a function of generating a display signal that causes the LCD monitor 5 or the face-mount display 6 (display unit) to display a measurement result or an operation menu and outputting the generated signal to the image-signal-processing circuit 12.

The reference point-designating section 18b (a reference point-designating unit) designates a reference point (details thereof are explained later) on a measurement object based on a signal input from the remote controller 4 or the PC 31. The reference point-designating section 18b calculates the coordinates of two arbitrary reference points input by the user who is observing the image of the measurement object displayed on the LCD monitor 5 or the face-mount display 6.

The reference curve-calculating section 18c (an approximate-outline-calculation unit) calculates a reference curve (details of the reference curve will be explained later) that corresponds to an approximate outline that approximates the outline of the measurement object based on the reference point designated by the reference point-designating section 18b. The loss-composing point-calculating section 18d (loss-composing points-calculating unit) calculates loss-composing points (details of the loss-composing points will be explained later) that constitute a loss outline (edge) formed on the measurement object based on the reference point and the reference curve.

The loss-type-identifying section 18e (loss-type-identifying unit) calculates an angle defined by two reference curves that correspond to the two reference points designated by the reference point-designating section 18b; and identifies the loss type based on the calculated angle. The loss size-calculating section 18f (loss-measurement unit) measures loss size based on the loss-composing points. The storage section 18g stores various type of information that will undergo processes conducted by the measurement-processing section 18. The information stored in the storage section 18g is read out by the control section 18a and is output to appropriate components.

Figure 3:
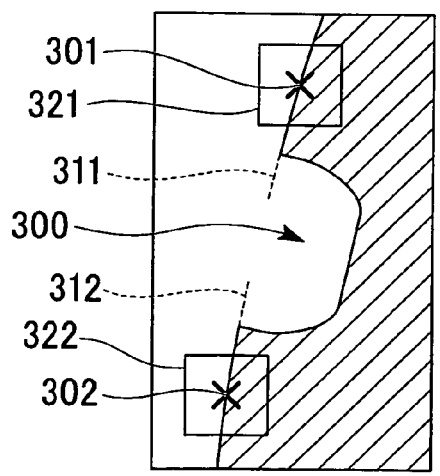
FIG. 3 shows a reference point, reference curve, and a reference point region in the first embodiment of the present invention.

Terms used in the present embodiment will be explained as follows. First, a reference point, a reference curve, and a reference point region will be explained with reference to FIG. 3. Reference points 301 and 302 on the displayed screen are actually designated by the user. As illustrated in FIG. 3, these points, disposed on both sides of a loss 300, are on edges that are free from losses.

Reference curves 311 and 312 approximating the outline of the measurement object (edge) are calculated based on the two reference points 301 and 302. In particular, a reference curve calculated in the present embodiment is a distortion-corrected curve calculated by correcting distortion of an image-pickup optical system provided to the distal end of the endoscope 2 (in the distal end section 21) and distortion of an image-pickup optical system (optical adapters 7a, 7b, and 7c) separately provided to the distal end of the endoscope 2.

Reference point regions 321 and 322 indicate image regions that extract an edge around the reference point in order to obtain the reference curves 311 and 312. The distortion-corrected curve may be calculated based on appropriately established size of reference point regions 321 and 322.

Subsequently, loss type, loss-start point, loss-end point, loss-apex point, and loss-composing points will be explained with reference to FIGS. 4 and 5. Two types of loss, i.e., an edge loss and a corner loss undergo the measurement according to the present embodiment.

Figure 4:
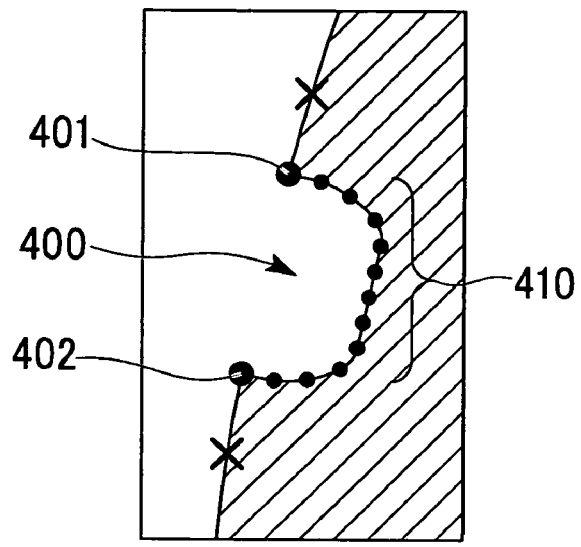
FIG. 4 shows an edge-loss-start point, an edge-loss-end point, and an edge-loss-composing point with respect to the first embodiment of the present embodiment.
Figure 5:
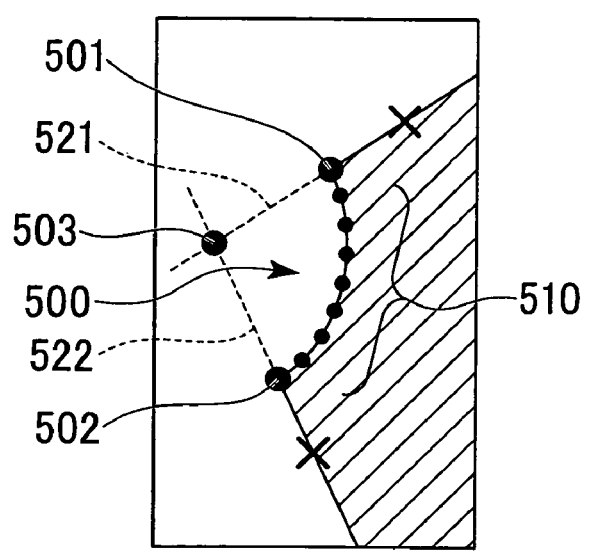
FIG. 5 shows a corner-loss-start point, a corner-loss-end point, and a corner-loss-composing point with respect to the first embodiment of the present embodiment.

FIG. 4 illustrates an edge loss 400 formed on a side of a measurement object and FIG. 5 illustrates a corner loss 500 formed on a corner defined by edge lines of a measurement object.

Loss-start points 401 and 501 displayed on a measurement screen undergo a loss calculation which will be explained later and are recognized first as constituting a loss. Loss-end points 402 and 502 are recognized last as forming the loss. A loss-apex point 503 is recognized as a cross-point between reference curves 521 and 522 forming a part of the corner loss 500. Loss-composing points 410 and 510 each including the loss-start point, loss-end point, and loss-apex point constitute a loss edge formed on the measurement object.

Loss size will be explained next with reference to FIGS. 6 and 7. Loss size is a parameter that represents a detected loss size. Size of an edge loss undergoing calculation of the present embodiment includes width, depth, and area, and size of a corner loss includes width, depth, and area. To be more specific, a width of the loss is a spatial distance between a loss-start point and a loss-end point. A depth of the loss is a spatial distance between a predetermined loss-composing point and a line connecting the loss-start point to the loss-end point. A spatial distance between the loss-apex point and the loss-start point, and a spatial distance between the loss-apex point and the loss-end point indicate a loss side. The loss area indicates an area of a space surrounded by all of the loss-composing points.

Figure 6:
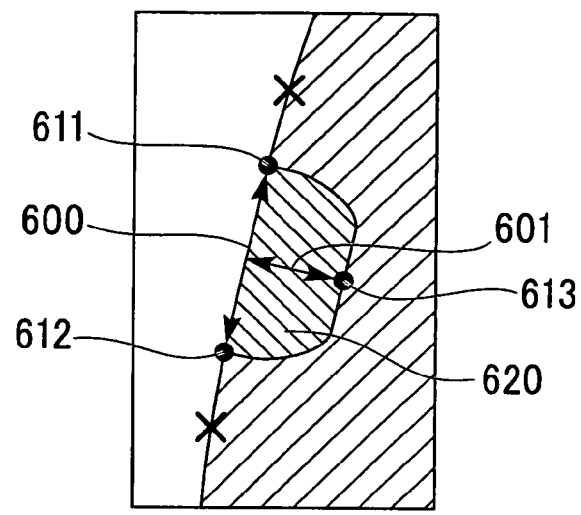
FIG. 6 shows an edge-loss width, an edge-loss depth, and an edge-loss area with respect to the first embodiment of the present embodiment.

FIG. 6 describes loss size with respect to an edge loss. A loss width 600, calculated by a loss calculation which will be explained later, indicates a spatial distance between a loss-start point 611 and a loss-end point 612. A loss depth 601 indicates a spatial distance between a predetermined loss-composing point 613 and a line between the loss-start point 611 and the loss-end point 612. The loss area indicates a spatial area 620 surrounded by all the loss-composing points including non-illustrated loss-composing points.

Figure 7:
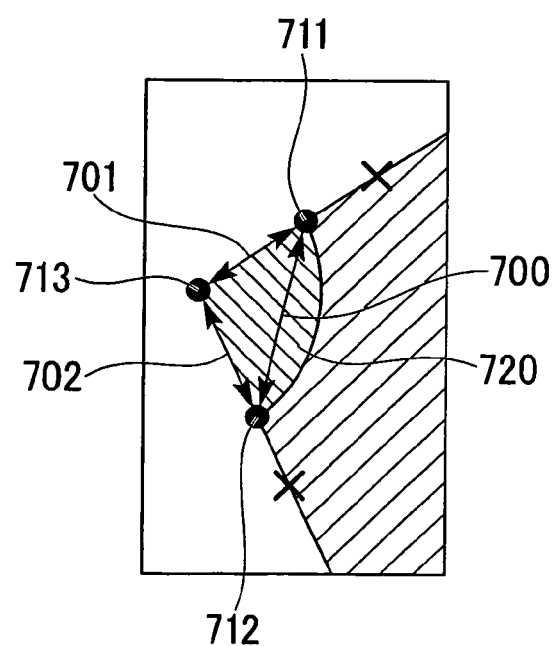
FIG. 7 shows a corner-loss width, a corner-loss length, and a corner-loss area with respect to the first embodiment of the present embodiment.

FIG. 7 describes loss size with respect to a corner loss. A loss width 700, calculated by a loss calculation which will be explained later, is a spatial distance between a loss-start point 711 and a loss-end point 712. A loss side 701 indicates a spatial distance calculated between a loss-apex point 713 and the loss-start point 711. A loss side 702 indicates a spatial distance calculated between the loss-apex point 713 and the loss-end point 712. The loss area indicates a spatial area 720 surrounded by all the loss-composing points including non-illustrated loss-composing points.

Figure 8:
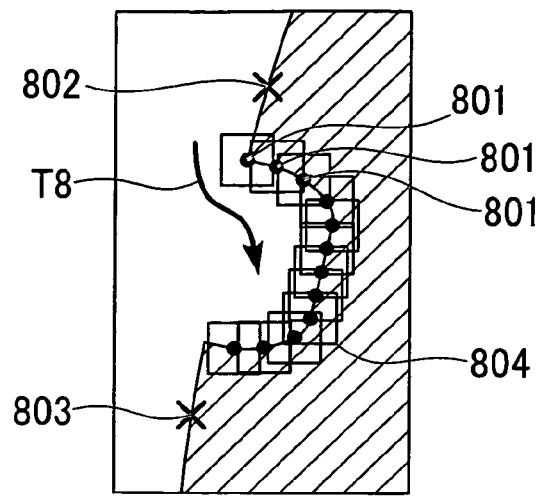
FIG. 8 shows a measurement point and a measurement point region in the first embodiment of the present invention.

A measurement point and a measurement point region will be explained next with reference to FIG. 8. Measurement points 801 on the edge of a measurement object on a displayed measurement screen undertake sequential search (exploration) in a direction from a first reference point 802 to a second reference point 803 in a loss calculation which will be explained later. In addition, some of the searched measurement points are recognized as loss-composing points.

A measurement point region 804 indicates an image region for use in searching of the measurement point 801 and extracting of the edge around the measurement point. The edge may be extracted based on an appropriately established size of the measurement point region 804.

Figure 9:
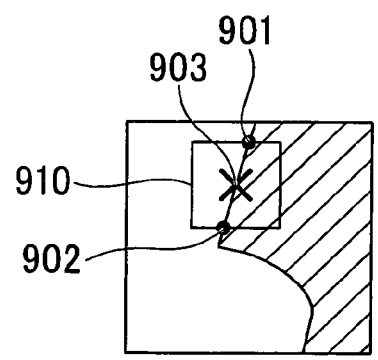
FIG. 9 shows the characteristic point in the first embodiment of the present invention.
Figure 10:
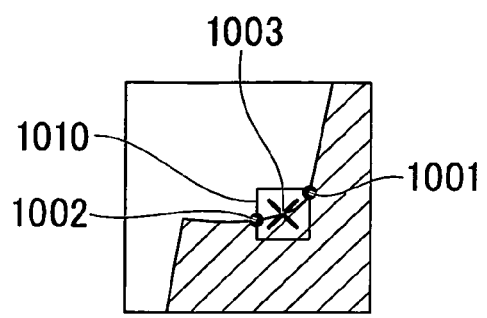
FIG. 10 shows the characteristic point in the first embodiment of the present invention.

Characteristic points will be explained next with reference to FIGS. 9 and 10. Characteristic points 901 and 902 on an edge are extracted within a reference point region 910 including a reference point 903. Also, characteristic points 1001 and 1002 on an edge are extracted within a measurement point region 1010 including a measurement point 1003. The characteristic points 901 and 902 extracted within the reference point region 910 are used for calculating a reference curve in a loss calculation which will be explained later. Some of the characteristic points extracted within, e.g., the measurement point region 1010 are selected as measurement points in the loss calculation.

Figure 11:
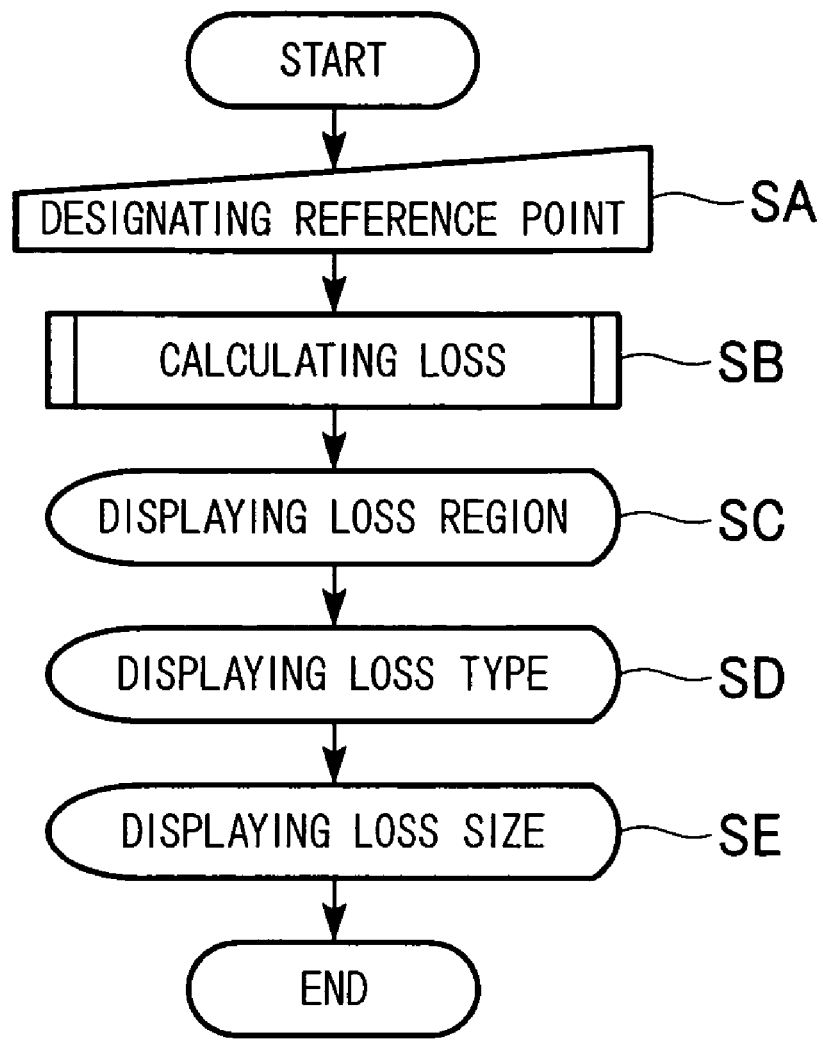
FIG. 11 is a flowchart showing the procedure of the loss measurement in the first embodiment of the present invention.
Figure 12:
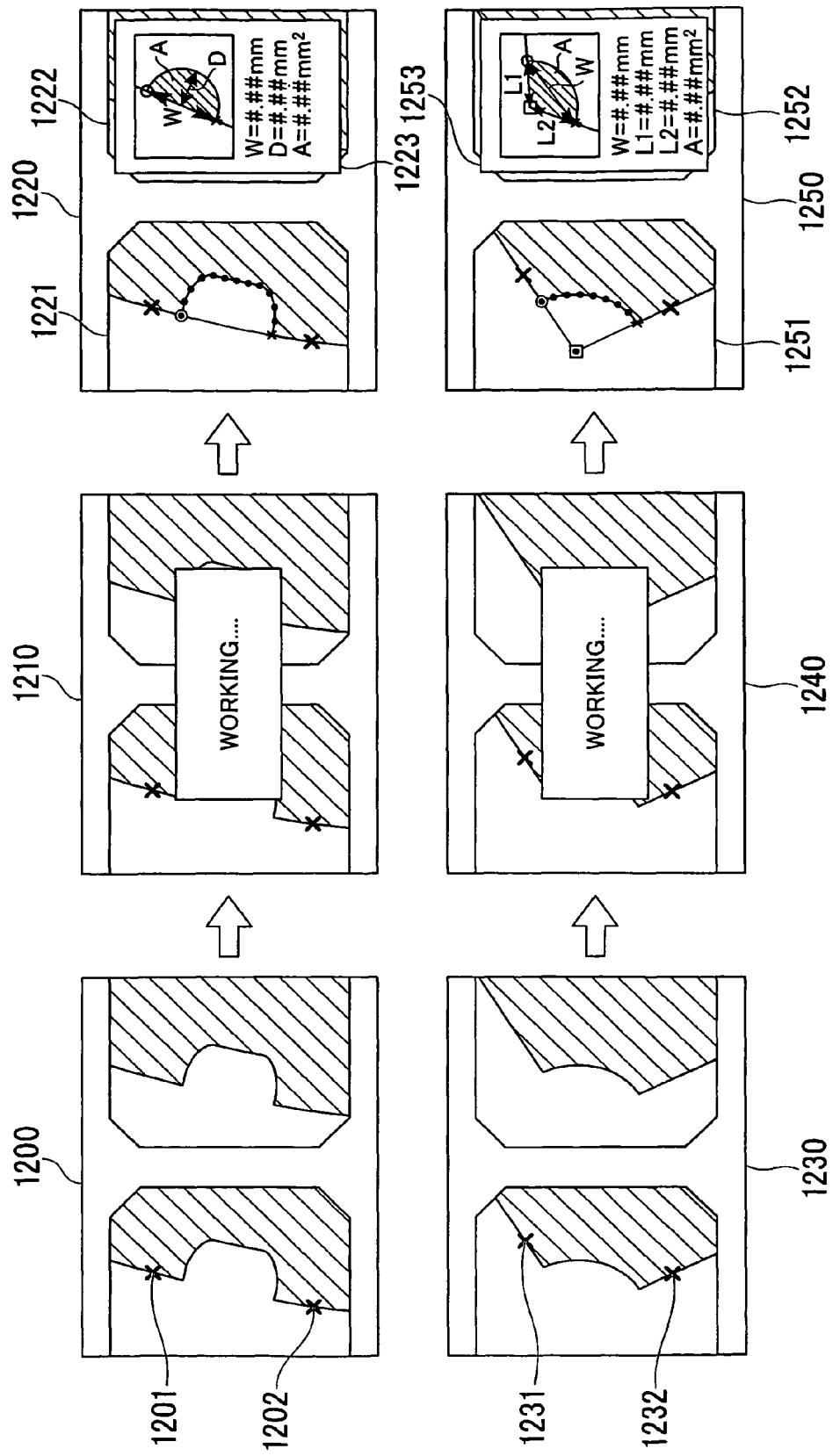
FIG. 12 shows a measurement screen displayed during a loss measurement in the first embodiment of the present invention.

A procedure of loss measurement according to the present embodiment will be explained next. Loss measurement and a measurement screen will be explained as follows with reference to FIGS. 11 and 12. FIG. 11 describes a procedure of the loss measurement. FIG. 12 shows a measurement screen. Measurement screens, shown in e.g., FIG. 12, may omit an operation menu. As illustrated in FIG. 12, measurement images 1200, 1210, and 1220 indicate that a measurement object is an edge loss, and measurement images 1230, 1240, and 1250 indicate that a measurement object is a corner loss.

The present embodiment implements stereoscopic loss measurement. A measurement object picked up by a stereoscopic optical adapter attached to the distal end section 21 of the endoscope 2 based on the stereoscopic measurement is viewed as a pair of images generated on a measurement screen.

First in the loss measurement, when user operates the remote controller 4 or the PC 31 and designates two reference points on a measurement screen displayed on the LCD monitor 5 or the face-mount display 6, the information of the reference points designated is input into the measurement-processing section 18 (step SA). Preferably, user selects the point on both sides of the loss and on the edge which is free from the loss as reference points. Reference points 1201 and 1202, and reference points 1231 and 1232 that are found in left-images in FIG. 12 are designated.

Subsequently, the measurement-processing section 18 implements a loss calculation based on the coordinates of the designated reference points (step SB). The loss calculation carries out a calculation with respect to coordinates of the loss-composing points and loss size; and identification of loss type. The measurement images 1210 and 1240 indicate measurement screens during calculation. Details of the loss calculation will be explained later.

When the loss calculation is completed, the detected loss region is displayed on the measurement screen based on an instruction by the measurement-processing section 18 (step SC), and simultaneously the loss type and the loss size are displayed (steps SD to SE). As illustrated in FIG. 12, the loss region is displayed on a left-image 1221 of the measurement image 1220 and on a left-image 1251 of the measurement image 1250. To be more specific, the calculated loss-composing points that are connected by lines are displayed. In addition, a loss-start point, a loss-end point, and a loss-apex point are each displayed as cursors "○", "*", and "□" among the loss-composing points.

In addition, images of the detected loss type are displayed in upper sections of result windows 1223 and 1253 of right-images 1222 and 1252 in the measurement images 1220 and 1250. In addition, letters indicating the detected loss size are displayed in lower sections of the result windows 1223 and 1253 of the right-images 1222 and 1252 in the measurement images 1220 and 1250.

Figure 13:
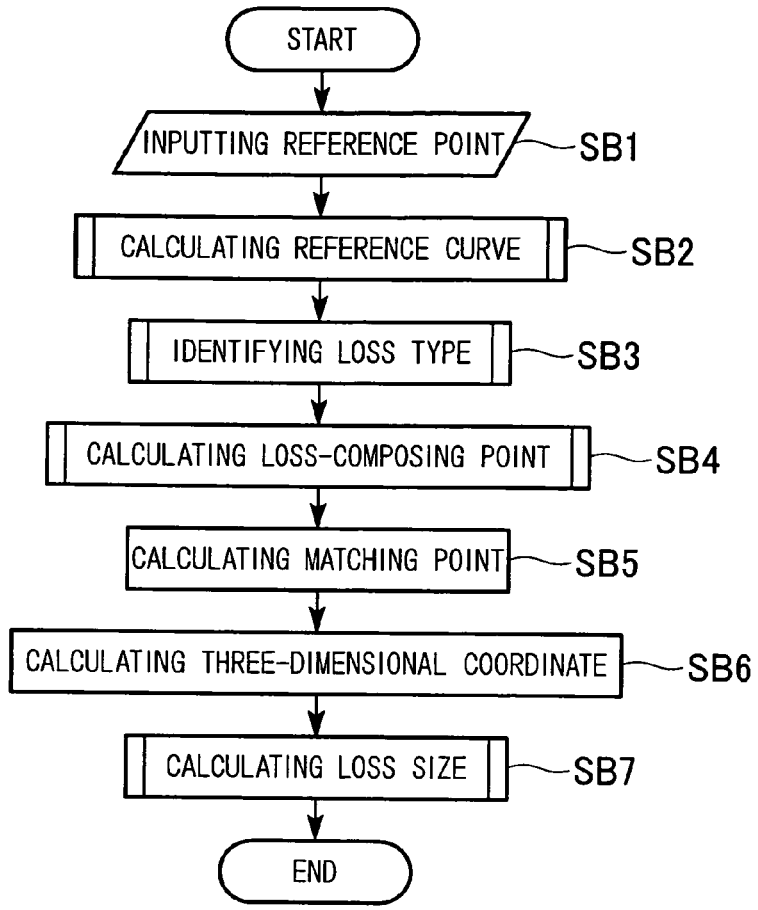
FIG. 13 is a flowchart showing the procedure of the loss calculation in the first embodiment of the present invention.

A procedure of loss calculation in step SB2 described in FIG. 11 will be explained next with reference to FIG. 13.

When positions of the two reference points designated by the user in the left-image are input into the measurement-processing section 18, the reference point-designating section 18*b* calculates image coordinates of the two reference points (two-dimensional coordinates on an image displayed on the LCD monitor 5 or the face-mount display 6) (step SB1). Subsequently, the reference curve-calculating section 18*c* calculates two reference curves based on the image coordinates of the two reference points (step SB2).

Subsequently, the loss-type-identifying section 18*e* calculates the angle defined by the two reference curves and identifies the loss type corresponding to the calculated angle (step SB3). Subsequently, the loss-composing point-calculating section 18*d* calculates the image coordinates of the loss-composing points based on the image coordinates of the two reference points (and using reference curves in the case of a corner loss) (step SB4).

Subsequently, the loss-composing point-calculating section 18*d* calculates the image coordinates of matching points in the right-image corresponding to the calculated loss-composing points in the left-images and further calculates the spatial coordinates of the loss-composing points (real-space three-dimensional coordinates) based on the calculated loss-composing points and the image coordinates of the matching points of the calculated loss-composing points (step SB6).

A method for calculating spatial coordinates is the same as that disclosed in Japanese Unexamined Patent Application, First Publication No. 2004-49638. The loss size-calculating section 18*f* finally calculates the loss size corresponding to the loss type based on the spatial coordinates of the calculated loss-composing points (step SB7).

Figure 14:
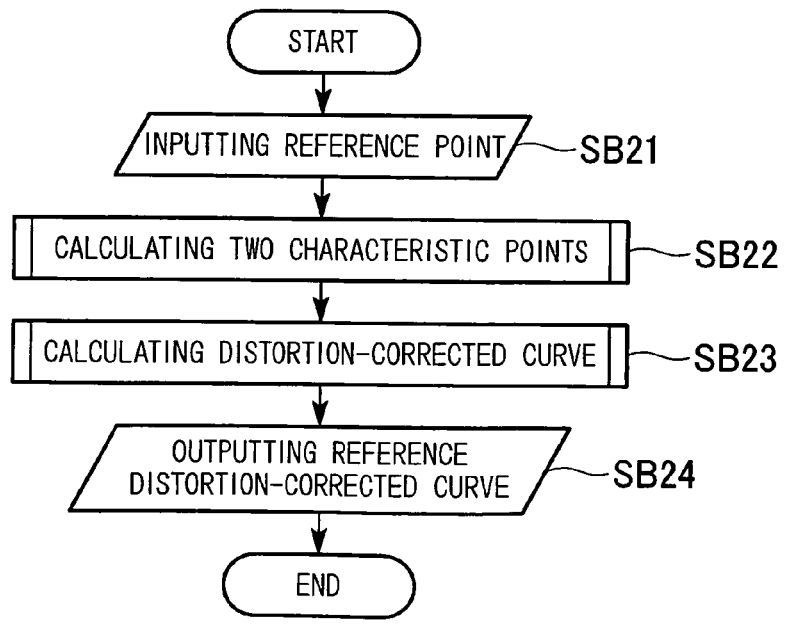
FIG. 14 is a flowchart showing a procedure of reference curve-calculation in the first embodiment of the present invention.

A procedure of calculating a reference curve in the step SB2 of FIG. 13 will be explained next with reference to FIG. 14. When the image coordinates of the two reference points calculated by the reference point-designating section 18*b* are input into the reference curve-calculating section 18*c* (step SB21), the reference curve-calculating section 18*c* calculates by two characteristic points with one reference point based on the image coordinate of the input reference point (step SB22).

Subsequently, the reference curve-calculating section 18*c* calculates a distortion-corrected curve, that the distortion of the objective optical system is corrected, based on the two characteristic points (step SB23). Accordingly, two distortion-corrected curves are calculated corresponding to the two reference points. The reference curve-calculating section 18*c* finally outputs the details of the reference curves, i.e., details of the distortion-corrected curve (indicated by the image coordinates of points that compose the curve, or a formula of the curve), to the control section 18*a* (step SB24).

A procedure of calculating characteristic points in the step SB22 will be explained with reference to FIG. 15 as follows. The calculation of characteristic points is carried out not only when a reference curve is calculated but also when loss-composing points are calculated. The calculation of characteristic points will be explained in summary here while the calculation of the loss-composing points will be explained later.

Figure 16:
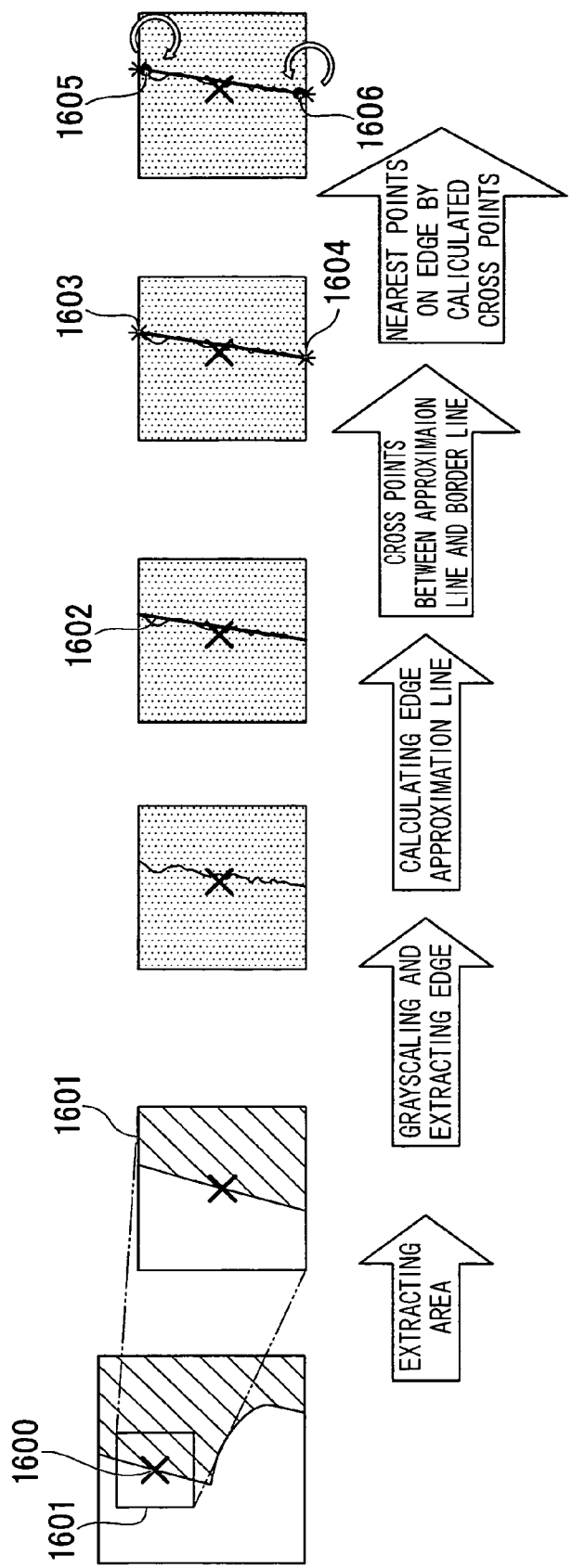
FIG. 16 shows a procedure of characteristic point calculation in the first embodiment of the present invention.
Figure 17:
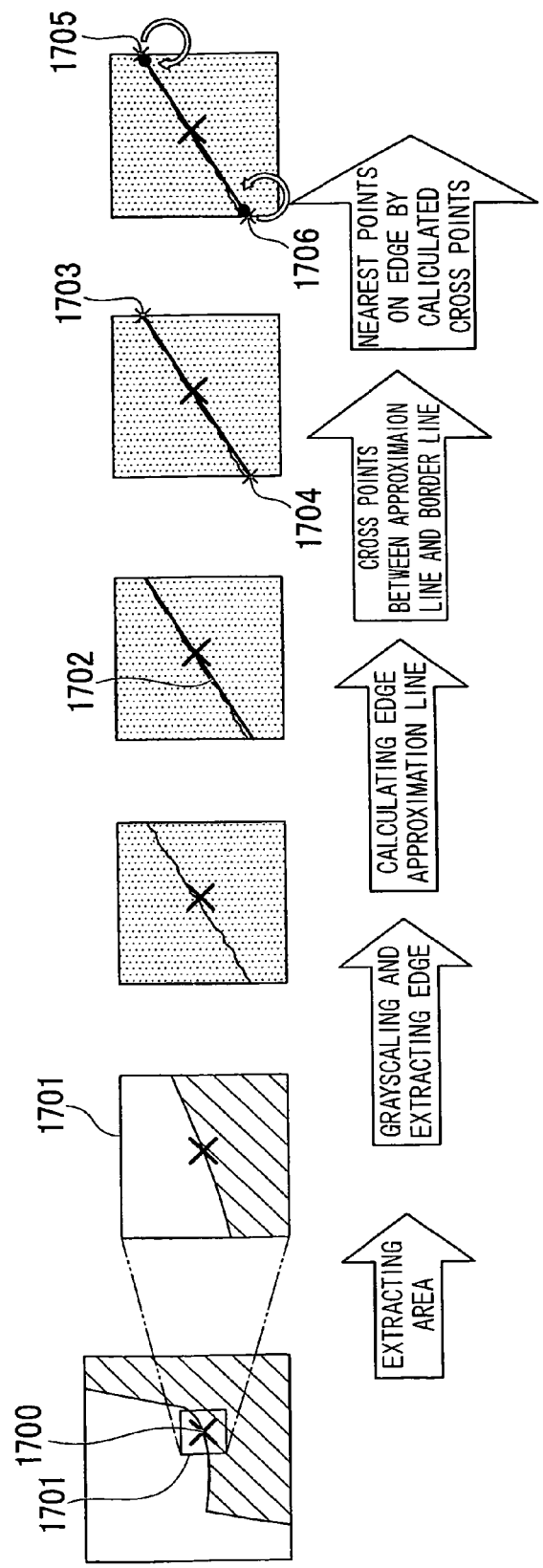
FIG. 17 shows a procedure of characteristic point calculation in the first embodiment of the present invention.

FIGS. 16 and 17 illustrating the calculation of characteristic points schematically are also referred to if necessary. FIG. 16 illustrates a procedure of calculating characteristic points around a reference point, and FIG. 17 illustrates a procedure of calculating characteristic points around a measurement point.

When the image coordinate of the reference point or the measurement point is input (step SF1), a region image within a reference point region or the measurement point region is extracted based on the input image coordinate of the reference point or the measurement point (step SF2). Accordingly, a region image 1601 within the reference point region including a reference point 1600, or a region image 1701 within the measurement point region including a measurement point 1700 is extracted.

Subsequently, the extracted region image is converted to grayscale (step SF3), and the edge is extracted from the grayscale image (step SF4). Subsequently, an approximated outline of the extracted edge is calculated (step SF5), and then two cross-points between the calculated edge approximation line and the region border line are calculated (step SF6). Accordingly, an edge approximation line 1602 or an edge approximation line 1702 is calculated. Cross-points 1603 and 1604 formed by the edge approximation line 1602 and the region border line, or cross-points 1703 and 1704 formed by the edge approximation line 1702 and the region border line are calculated.

Finally, nearest points on the extracted edge by the calculated cross-points are calculated (step SF7), and the two calculated nearest points are output into the control section 18*a* as characteristic points (step SF8). Accordingly, the characteristic point, i.e., nearest points 1605 and 1606 corresponding to the cross-points 1603 and 1604, or the nearest points 1705 and 1706 corresponding to the cross-points 1703 and 1704 are output.

Preferably, edge extraction should adapt a method that can minimize noise in an extracted image since an edge approximation line is calculated after the edge extraction of the step SF4. A usable first-differential filter may be e.g., a Sobel filter, a Prewitt filter, or a gradient filter, and a usable second-differential filter may be e.g. a Laplacian filter.

Alternatively, edge extraction may be conducted by combining filters corresponding to processes, e.g., dilation, erosion, subtraction, and noise-reduction. A method that is necessary to binarize this grayscale image state may use a fixed threshold value. Also, a method for changing a threshold based on brightness of the grayscale image may be a P-tile method, mode method, or discriminant analysis method.

Also, the edge approximation line is calculated in the step SF5 by using, e.g., a simple least squares method that is based on details of the edge extracted in the step SF4. It should be noted that curve approximation using quadratic function may be conducted in contrast to linear approximation conducted with respect to edge shape as explained above. Curve approximation may provide more accurate calculation of characteristic points if the edge shape is curved rather than straightened.

A procedure of calculating distortion-corrected curves in step SB23 of FIG. 14 will be explained next. The endoscope 2 adapted to the endoscope apparatus 1 according to the present embodiment measures optical data of the image-pickup optical system that is unique to each endoscope 2. The measured optical data is stored in, e.g., the flash memory card 33. The use of optical data allows a measurement image to be converted into a distortion-corrected image with respect to the image-pickup optical system.

Figure 18:
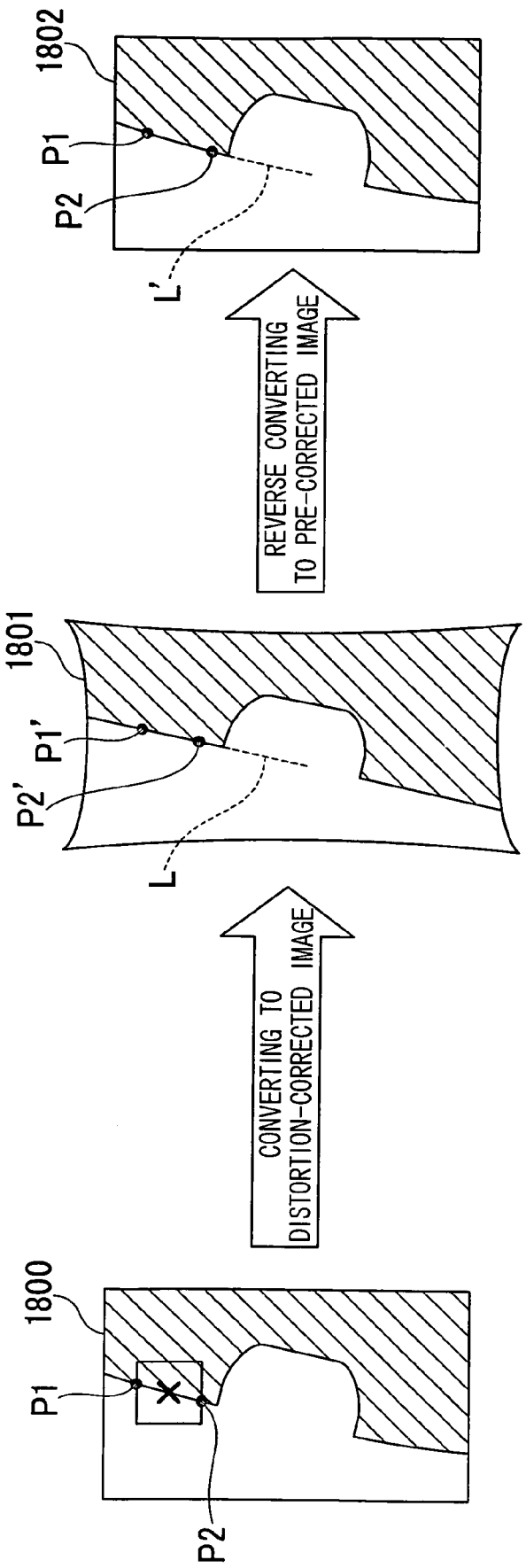
FIG. 18 shows a procedure of calculating a distortion-corrected curve in the first embodiment of the present invention.

A method for calculating a distortion-corrected curve will be explained as follows with reference to FIG. 18. An original image 1800 is the image of a measurement object. Points P1 and P2 are two characteristic points calculated in step SB22 of FIG. 14. Converting the original image 1800 by using the optical data obtains a distortion-corrected image 1801. Points P1' and P2' are post-conversion points of P1 and P2, respectively.

Reverse conversion conducted with respect to each pixel point on a line L causes the line L to be converted to a curve L' on the original image 1802 where the line L indicates a line calculated by connecting the point P1' to P2' on the distortion-corrected image 1801. Details of the curve L', i.e., distorted line passing through the points P1 and P2 is output to the control section 18a. Details of optical data, the method of producing thereof, and a distortion-correcting Method are the same as those disclosed in Japanese Unexamined Patent Application, First Publication No. 2004-49638.

Figure 19:
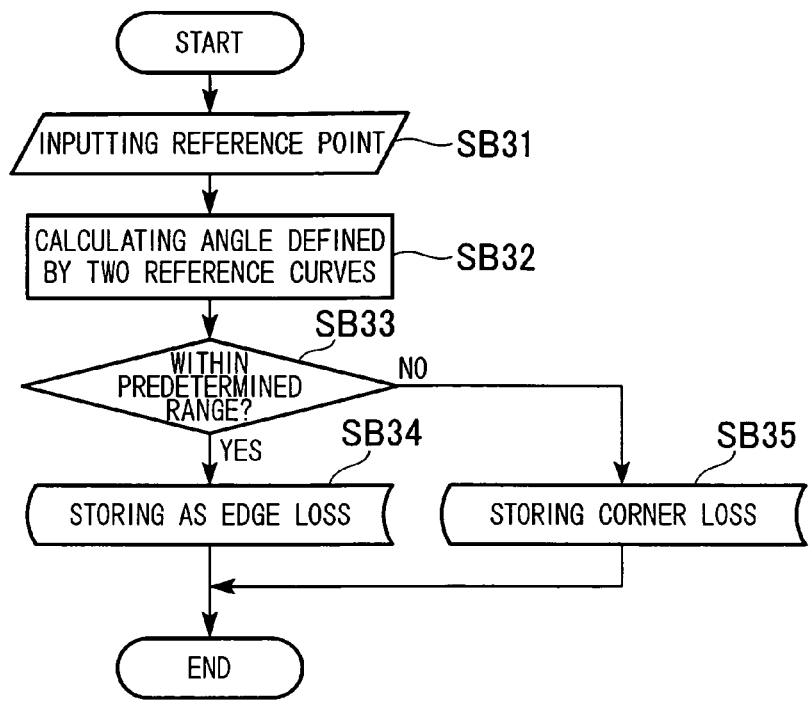
FIG. 19 is a flowchart showing a procedure of loss type identification in the first embodiment of the present invention.

A procedure of calculating a reference curve in the step SB2 of FIG. 13 will be explained next with reference to FIG. 19. The loss-type-identifying section 18e upon undertaking the input of details of the two reference curves from the control section 18a (step SB31) causes the loss-type-identifying section 18e to calculate the angle defined by the two reference curves (step SB32).

Subsequently, the loss-type-identifying section 18e determines as to whether or not the angle defined by the two reference curves is within a predetermined range (step SB33).

In a case where the angle defined by the two reference curves is in the predetermined range (e.g., the angle is close to 180°), the loss-type-identifying section 18e upon determining that a loss is of edge-type outputs the loss identification result to the control section 18a. The control section 18a stores the loss identification result in the storage section 18g (step SB34). In a case where the angle defined by the two reference curves is not in the predetermined range (e.g., the angle is close to 90°), the loss-type-identifying section 18e upon determining that a loss is of corner-type outputs the loss identification result to the control section 18a. The control section 18a stores the loss identification result in the storage section 18g (step SB34).

Figure 20:
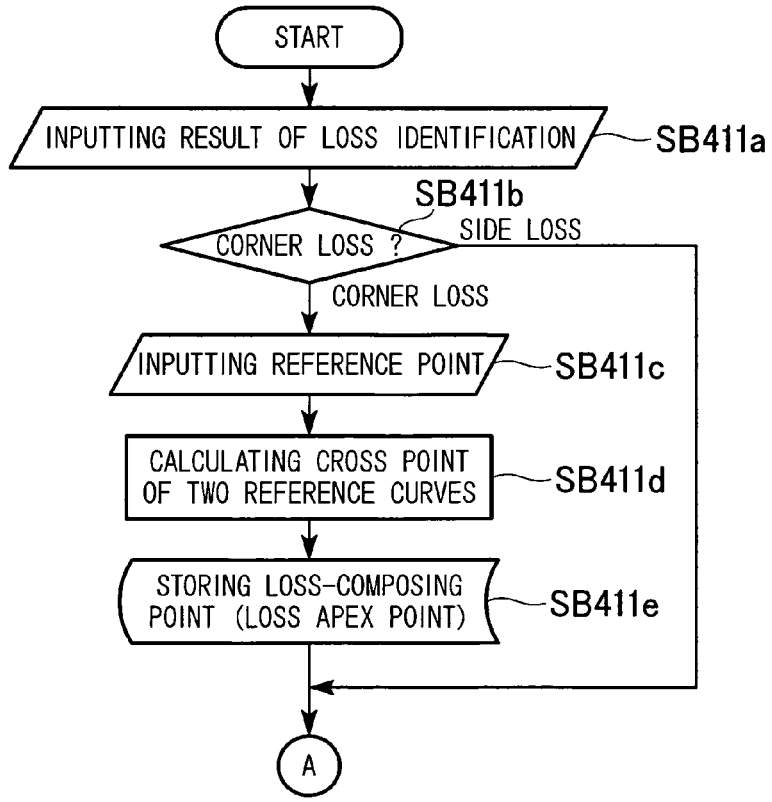
FIG. 20 is a flowchart showing a procedure of loss-apex calculation in the first embodiment of the present invention.

A procedure of calculating loss-composing points in step SB24 of FIG. 13 will be explained next. Calculation of the loss-composing points includes processes of loss-apex-calculation, loss-start-point calculation, two-types-of-measurement-points-calculation, and loss-end-point-calculation. The loss-apex-calculation will be explained first with reference to FIG. 20.

The loss-composing point-calculating section 18d upon undertaking the input of the loss identification result from the control section 18a (step SB411a) identifies the loss type based on the identification result (step SB411b). If the loss is of corner type, the details of the two reference curves are input by the control section 18a (step SB411c).

The loss-composing point-calculating section 18d calculates the cross-point between the two reference curves based on the input details (step SB411d) and outputs the image coordinate of the calculated cross-point. The control section 18a stores the image coordinate of the cross-point between the two reference curves, i.e., the image coordinate of the loss-composing points (loss-apex point) in the storage section 18g (step SB411e). Subsequently, the procedure moves to a first-measurement-point-calculation described in FIG. 21. Also, if the loss is of edge-type, the procedure subsequent to the step SB411b moves to the first-measurement-point-calculation described in FIG. 21.

Figure 21:
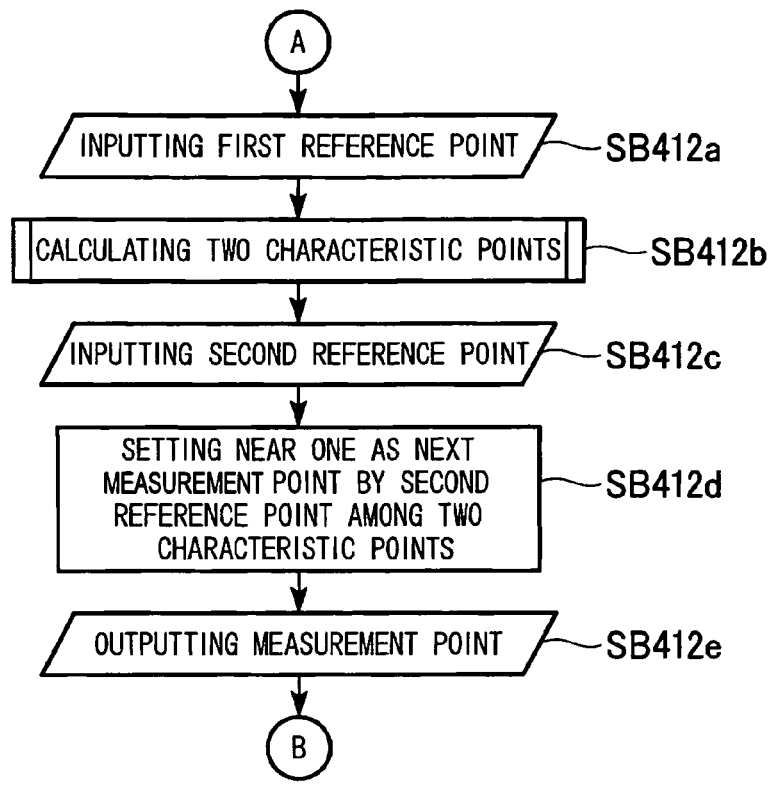
FIG. 21 is a flowchart showing a procedure of first-measurement-point-calculation in the first embodiment of the present invention.
Figure 22:
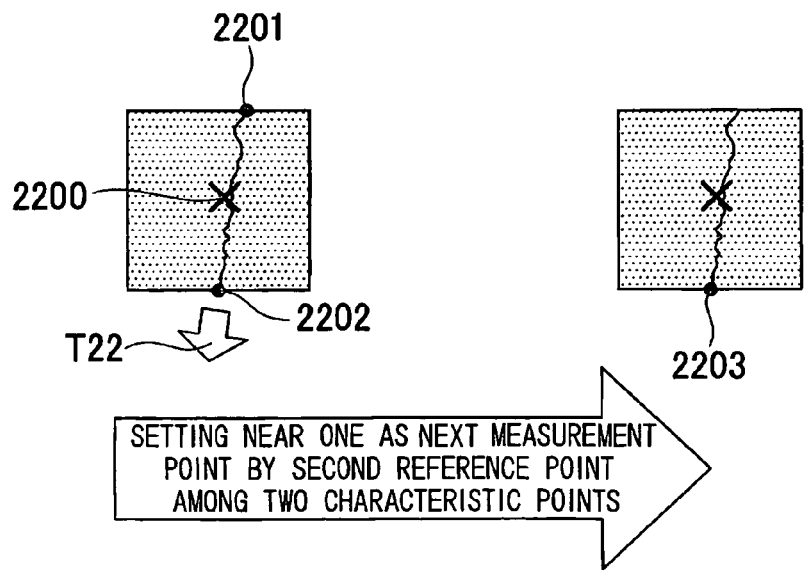
FIG. 22 shows a procedure of the first-measurement-point-calculation in the first embodiment of the present invention.

A procedure of the first-measurement-point-calculation will be explained next with reference to FIG. 21. FIG. 22 schematically showing a procedure of the first-measurement-point-calculation will be referred to if necessary. The loss-composing point-calculating section 18d upon carrying out the input of an image coordinate of a first one of two reference points that have been designated first (step SB412a) by the user executes the calculation of the characteristic point as shown in FIG. 15 and calculates the two characteristic points (step SB412b). This results in calculating two characteristic points 2201 and 2202 corresponding to a first reference point 2200.

Subsequently, the image coordinates of a second reference point are input by the control section 18a (step SB412c). The loss-composing point-calculating section 18d calculates a two-dimensional distance between the two characteristic points and the second reference point. The characteristic point closer to the second reference point are a next measurement point (step SB412d).

In a case where a direction of the second reference point is a direction T22 in FIG. 22, one of the two characteristic points 2201 and 2202, i.e., the characteristic point 2202 is a next measurement point 2203.

Subsequently, the loss-composing point-calculating section 18d outputs the image coordinate of the calculated cross-point to the control section 18a. The control section 18a stores the image coordinate of the measurement point in the storage section 18g (step SB412e). Subsequently, the procedure moves to a loss-start-point-calculation described in FIG. 23.

Figure 23:
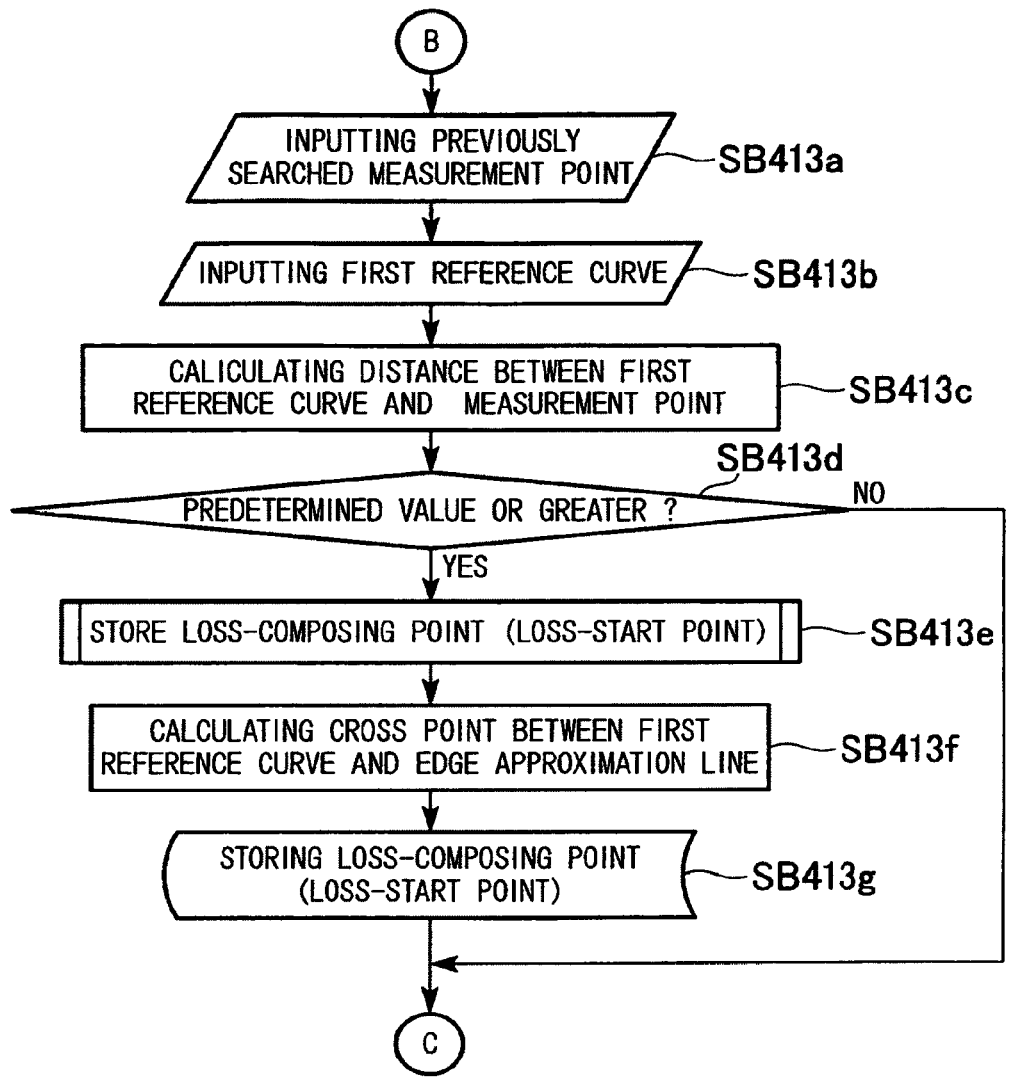
FIG. 23 is a flowchart showing a procedure of loss-start point calculation in the first embodiment of the present invention.
Figure 24:
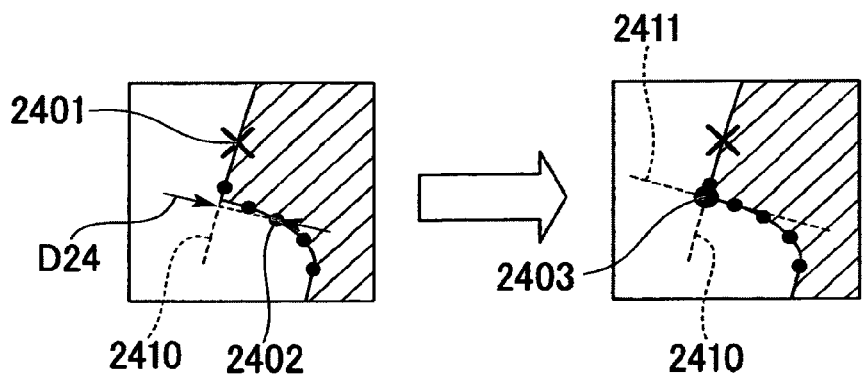
FIG. 24 shows a procedure of loss-start point calculation in the first embodiment of the present invention.

The loss-start-point-calculation will be explained next with reference to FIG. 23. FIG. 24 schematically showing a procedure of the loss-start-point-calculation will be referred if necessary. First, the image coordinate of the previously obtained measurement point is input by the control section 18a (step SB413a). Details of the first reference curve calculated based on the first reference point are input by the control section 18a (step SB413b).

Subsequently, the loss-composing point-calculating section 18*d* upon calculating the two-dimensional distance between the first reference curve and the measurement point (step SB413*c*) determines as to whether or not the calculated two-dimensional distance is a predetermined value or greater (step SB413*d*). In a case where the calculated two-dimensional distance is greater than the predetermined value, the loss-composing point-calculating section 18*d* calculates an edge approximation line that is calculated by approximating the edge of the measurement object (step SB413*e*). An edge approximation line 2411 is calculated in a case of, e.g., FIG. 24 where the two-dimensional distance D24 between a first reference curve 2410 and a measurement point 2402 calculated based on the first reference point 2401 is the predetermined value or greater.

Subsequently, the loss-composing point-calculating section 18*d* calculates the cross-point between the first reference curve and the edge approximation line (step SB413*f*). Accordingly, the cross-point 2403 between the first reference curve 2410 and the edge approximation line 2411 is calculated.

Figure 25:
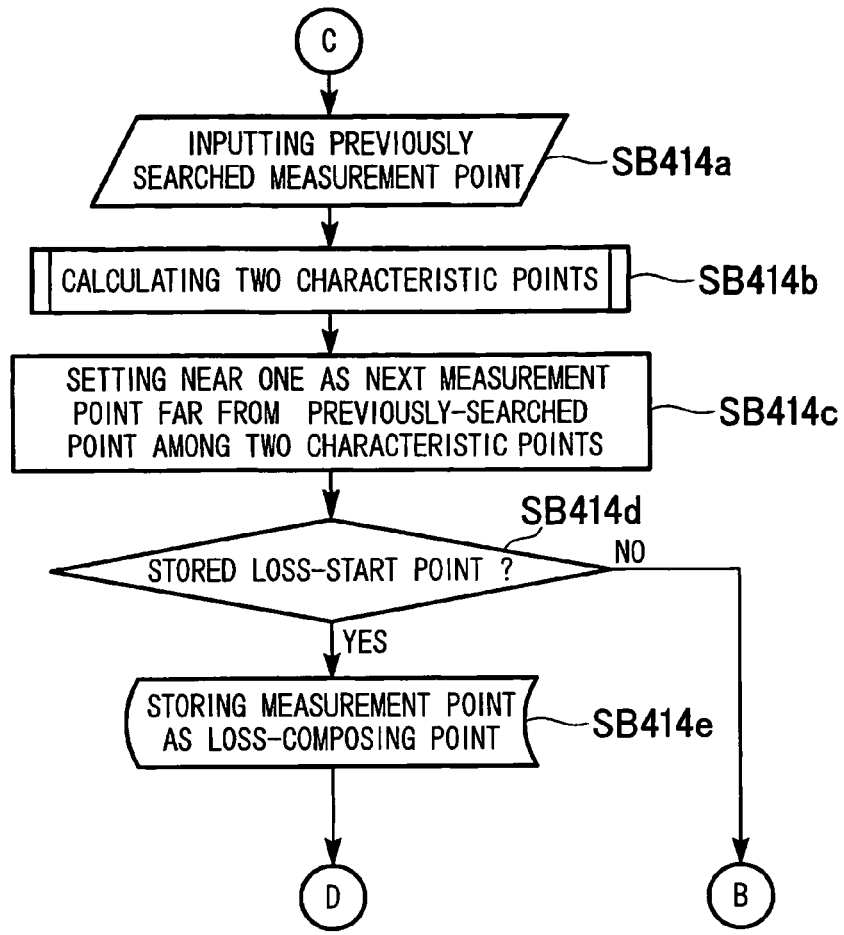
FIG. 25 is a flowchart showing a procedure of second-measurement-point-calculation in the first embodiment of the present invention.

Subsequently, the loss-composing point-calculating section 18*d* outputs the image coordinate of the calculated cross-point to the control section 18*a*. The control section 18*a* stores the image coordinate of the cross-point, i.e., the image coordinate of the loss-composing points (loss-start point) in the storage section 18*g* (step SB413*g*). Subsequently, the procedure moves to a first-measurement-point-calculation described in FIG. 25. Also, the procedure subsequent to the step SB413*d* moves to the second-measurement-point-calculation as shown in FIG. 25 in a case where the two-dimensional distance calculated in the step SB413*c* is smaller than the predetermined value.

Figure 26:
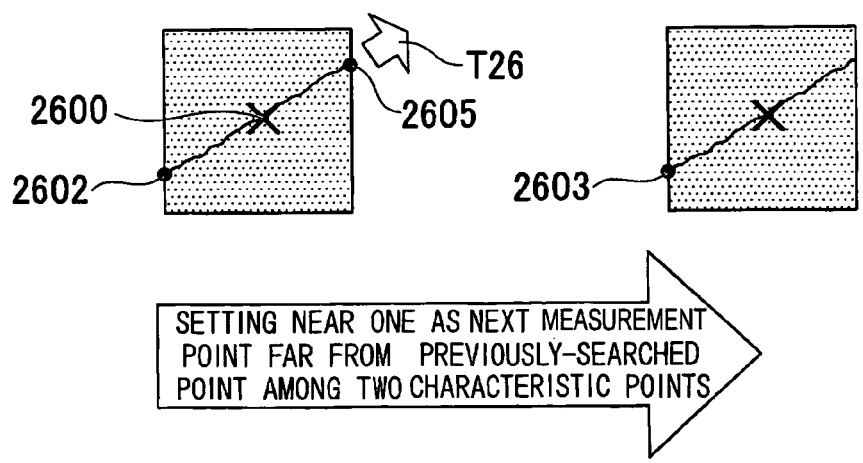
FIG. 26 shows a procedure of the second-measurement-point-calculation in the first embodiment of the present invention.

A procedure of the first-measurement-point-calculation will be explained next with reference to FIG. 25. FIG. 26 schematically showing a procedure of the first-measurement-point-calculation will be referred to if necessary. The loss-composing point-calculating section 18*d*, upon carrying out the input of the image coordinate of the previously obtained measurement point by the control section 18*a* (step SB414*a*), executes a calculation of the characteristic point as shown in FIG. 15 and calculates two characteristic points (step SB414*b*). Accordingly, two characteristic points 2601 and 2602 corresponding to the measurement point 2600 are calculated.

Subsequently, the loss-composing point-calculating section 18*d* calculates two-dimensional distances between the characteristic point and the two previously obtained measurement points. The characteristic point that is farther from the previously obtained measurement is a next measurement point (step SB414*c*). The characteristic point 2602 of the characteristic points 2601 and 2602 is a next measurement point 2603 in a case where the direction indicating the previously obtained measurement point is a direction T22 of FIG. 26.

Subsequently, the loss-composing point-calculating section 18*d* determines as to whether or not the image coordinate of the loss-start point is previously stored in the storage section 18*g* (step SB414*d*). The loss-composing point-calculating section 18*d* outputs the image coordinate of the calculated measurement point to the control section 18*a* in a case where the image coordinate of the loss-start point has been previously stored in the storage section 18*g*. The control section 18*a* stores the image coordinate of the measurement point, i.e., the image coordinate of the loss-composing points in the storage section 18*g* (step SB414*e*). Subsequently, the procedure moves to a loss-end-point-calculation described in FIG. 27. The procedure moves again to the loss-start-point-calculation as shown in FIG. 23 in a case where the image coordinate of the loss-start point has not been stored in the storage section 18*g* yet.

Figure 27:
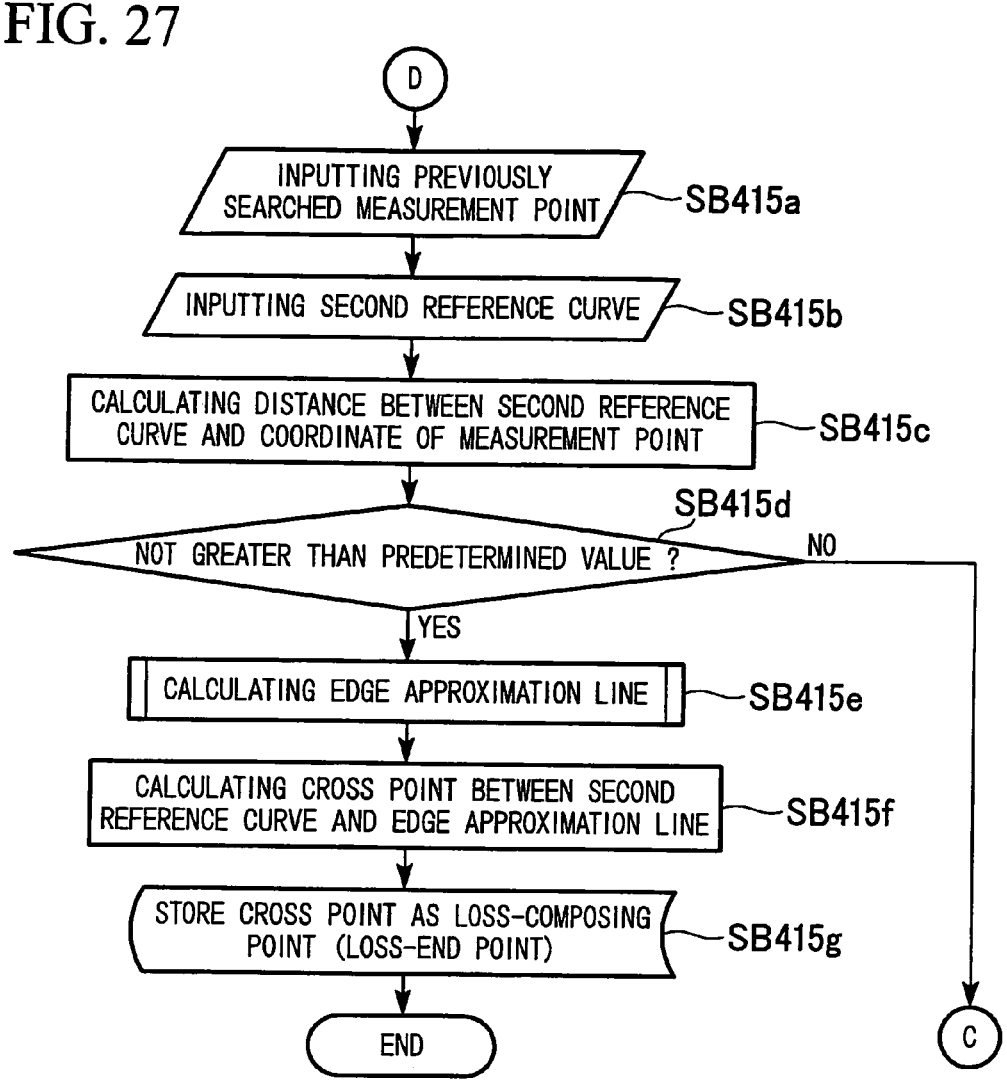
FIG. 27 is a flowchart showing a procedure of loss-end-point calculation in the first embodiment of the present invention.
Figure 28:
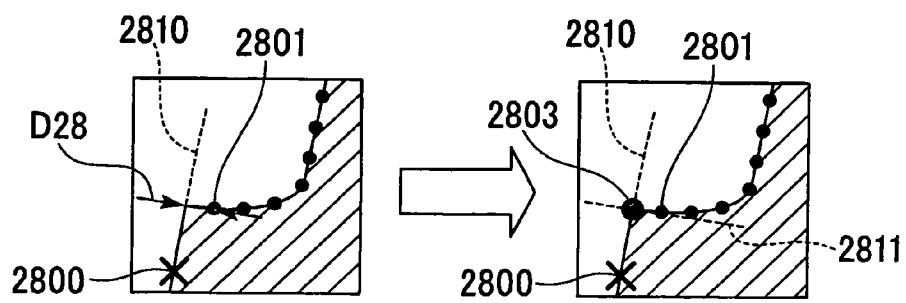
FIG. 28 shows a procedure of loss-end point calculation in the first embodiment of the present invention.

The procedure of the loss-end-point-calculation will be explained with reference to FIG. 27. Also, FIG. 28 schematically showing the procedure of the loss-end-point-calculation will be referred to if necessary. First, the image coordinate of the previously obtained measurement point is input by the control section 18*a* (step SB415*a*). Details of the second reference curve calculated based on the second reference point are input by the control section 18*a* (step SB415*b*).

Subsequently, the loss-composing point-calculating section 18*d* upon calculating the two-dimensional distance between the second reference curve and the measurement point (step SB415*c*) determines as to whether or not the calculated two-dimensional distance is a predetermined value or smaller (step SB415*d*). In a case where the calculated two-dimensional distance is the predetermined value or smaller, the loss-composing point-calculating section 18*d* calculates an edge approximation line that is calculated by approximating the edge of the measurement object (step SB415*e*). An edge approximation line 2811 is calculated in a case of, e.g., FIG. 28 where a two-dimensional distance D28 between a second reference curve 2800 and the calculated second measurement point 2810 calculated based on the second reference point 2800 is the predetermined value or smaller.

Subsequently, the loss-composing point-calculating section 18*d* calculates the cross-point between the first reference curve and the edge approximation line (step SB413*f*). Accordingly, the cross-point 2810 between the first reference curve 2811 and the edge approximation line 2803 is calculated.

Subsequently, the loss-composing point-calculating section 18*d* outputs the image coordinate of the calculated cross-point to the control section 18*a*. The control section 18*a* stores the image coordinate of the cross-point, i.e., the image coordinate of the loss-composing points (loss-end point) in the storage section 18*g* (step SB415*g*). This process finishes the whole procedure of calculating the aforementioned loss-composing points. Also, the procedure moves to the second-measurement-point-calculation again as shown in FIG. 25 in a case where the two-dimensional distance calculated in the step SB415*c* exceeds the predetermined value.

Figure 29:
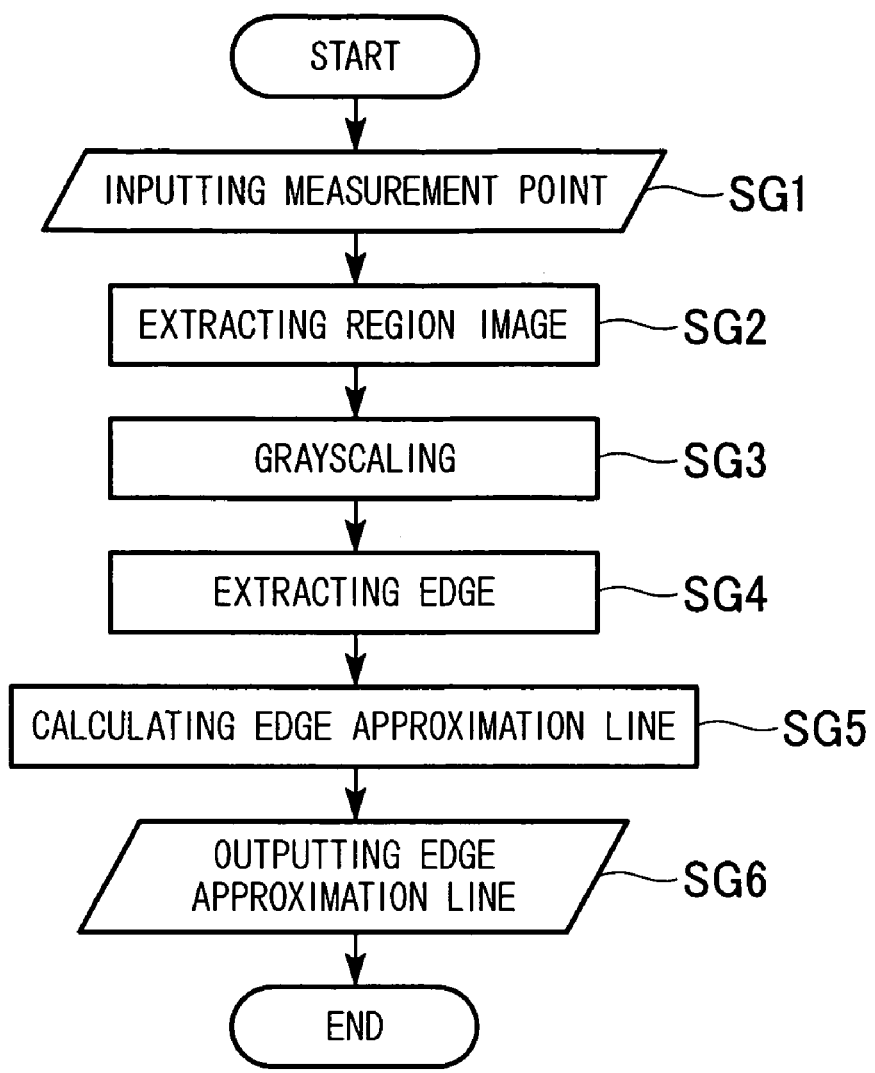
FIG. 29 is a flowchart showing a procedure of edge approximation line calculation in the first embodiment of the present invention.

A procedure of calculating the edge approximation line in the step SB413*e* of FIG. 23 and in the step SB415*e* of FIG. 27 will be explained with reference to FIG. 29. The loss-composing point-calculating section 18*d*, upon carrying out an input of the image coordinate of a measurement point (step SG1), extracts a region image in a measurement point region based on the image coordinate of the input measurement point (step SG2).

Subsequently, the loss-composing point-calculating section 18*d* converts the extracted region image to grayscale (step SG3) and implements edge extraction to the grayscale image (step SG4). Subsequently, the loss-composing point-calculating section 18*d* calculates the approximation line of the extracted edge (step SG5) and outputs details of the calculated edge approximation line to the control section 18*a* (step SG6).

Figure 15:
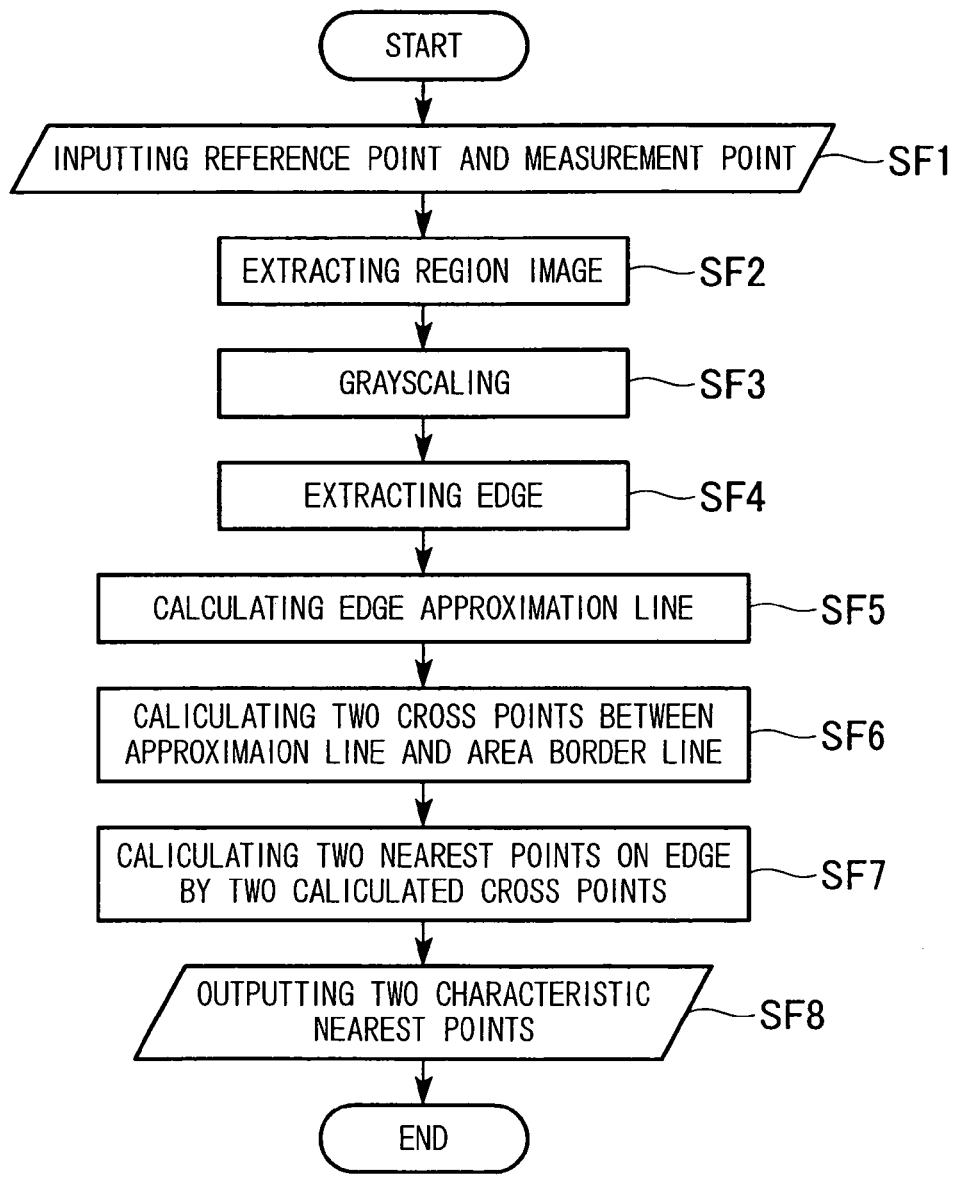
FIG. 15 is a flowchart showing a procedure of characteristic point calculation in the first embodiment of the present invention.

The processes of the aforementioned steps SG1 to SG 5 are the same as those of the steps SF1 to SF5 of FIG. 15.

A method for calculating a matching point in the step SB5 of FIG. 13 will be explained next. The loss-composing point-calculating section 18*d* executes a process of pattern-matching based on the loss-composing points calculated by the aforementioned loss calculation and calculates the matching point that corresponds to the left-image and right-images. The pattern-matching method is the same as that is disclosed in Japanese Unexamined Patent Application, First Publication No. 2004-49638.

However, sometimes the pattern-matching process does not work and a matching point cannot be calculated in a case where the loss is of corner-type, since the loss-apex point positioned in the background of the measurement object does not have a characteristic pattern, e.g., the edge on the image. Therefore, the present embodiment implements the calculation of the matching point of the loss-apex point as follows in a case where the loss is of corner-type.

Figure 30A:
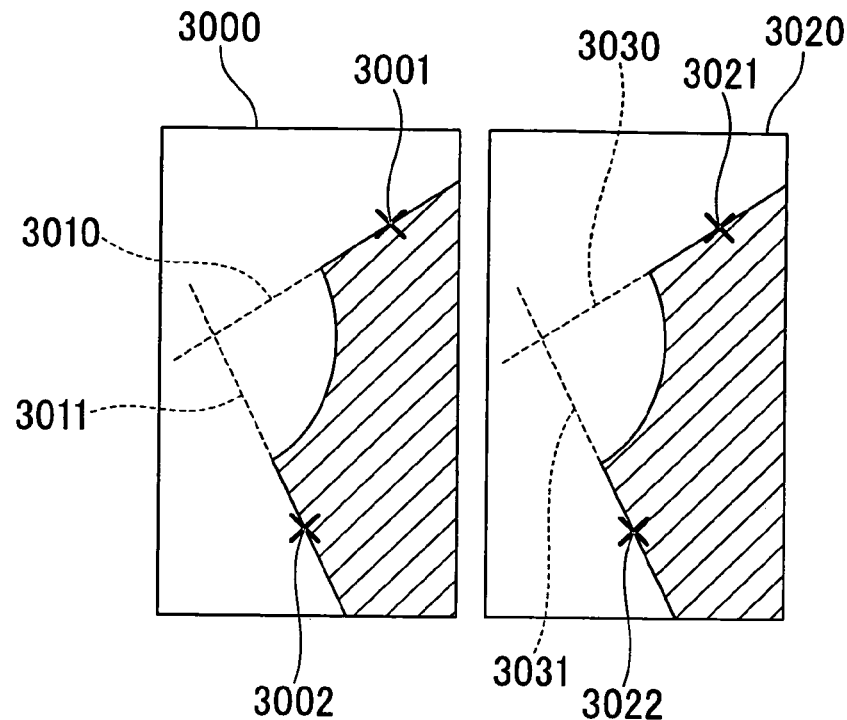
FIGS. 30A and 30B shows a method for calculating a matching point in the first embodiment of the present invention.

As shown in FIG. 30A, first calculated are matching points 3021 and 3022 in a right-image 3020 that correspond to reference points 3001 and 3002 in a left-image 3000. Subsequently, calculated are reference curves 3010 and 3011 passing through the reference points 3001 and 3002 respectively and reference curves 3030 and 3031 passing through the matching points 3021 and 3022 respectively.

Figure 30B:
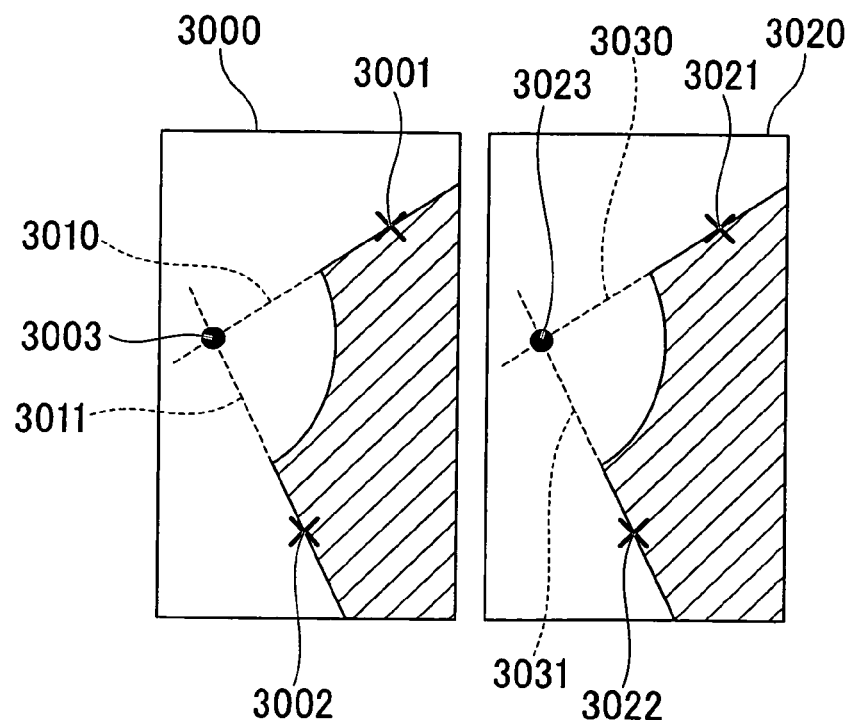

Subsequently calculated as a loss-apex point as shown in FIG. 30B is a cross-point 3003 between the reference curves 3010 and 3011 in the left-image 3000. A cross-point 3023 between the reference curves 3030 and 3031 in the right-image 3020 is calculated and assumed as the matching point of the loss-apex point.

Figure 31:
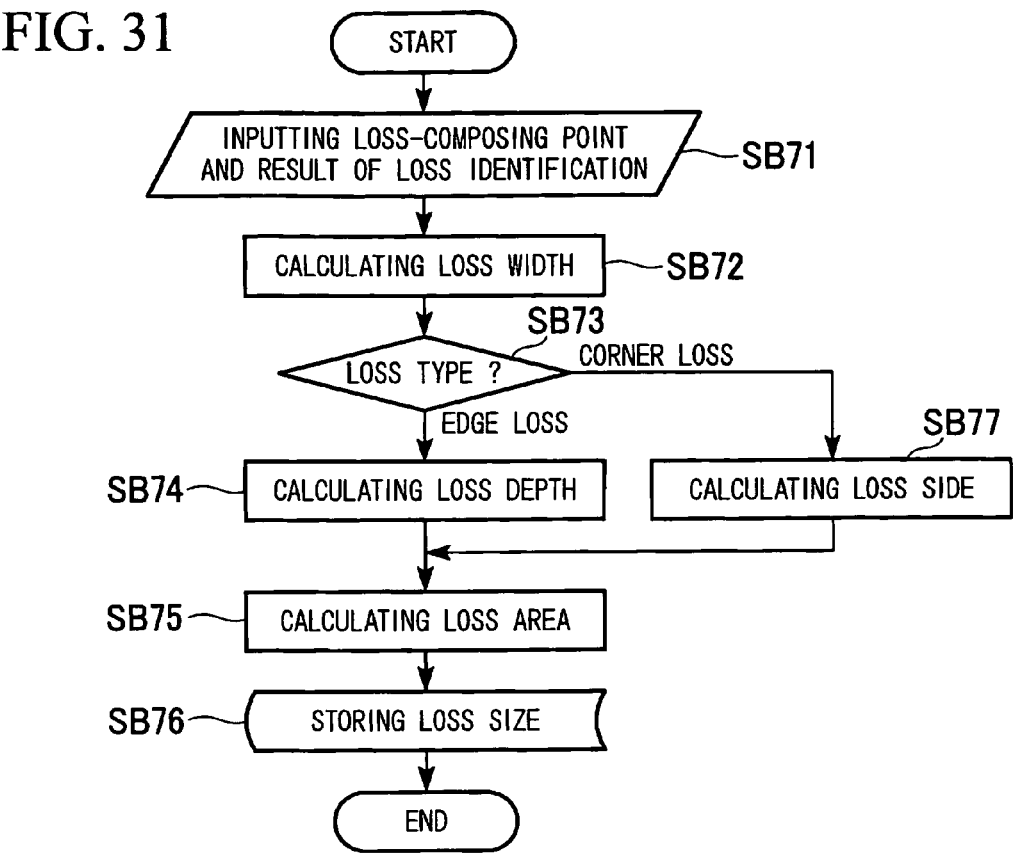
FIG. 31 is a flowchart showing a procedure of loss-size calculation in the first embodiment of the present invention.

A procedure of calculating loss size in the step SB7 of FIG. 13 will be explained next with reference to FIG. 31. The spatial coordinates (three-dimensional coordinates) of the loss-composing points and a loss-identification result are input into the loss size-calculating section 18$f$ (step SB71), calculates a loss width (the spatial distance between the loss-start point and the loss-end point) (step SB72).

Subsequently, the loss size-calculating section 18$f$ identifies the loss type based on the loss identification result (step SB73). The loss size-calculating section 18$f$ calculates a loss depth, i.e., a spatial distance between a predetermined loss-composing points and a line connecting the loss-start point to the loss-end point (step SB74) when the loss is of edge type. The loss size-calculating section 18$f$ furthermore calculates a loss area, i.e., a spatial area of a region surrounded by all of the loss-composing points (step SB75).

Subsequently, the loss size-calculating section 18$f$ outputs the calculated loss size to the control section 18*a*.

The control section 18*a* stores the loss size in the storage section 18*g* (step SB76). Alternatively, the loss size-calculating section 18$f$ calculates a loss side, i.e., a spatial distance between the loss-apex point and the loss-start point and a spatial distance between the loss-apex point and the loss-end point (step SB77) in a case where the loss is of corner type. Subsequently, the procedure moves to step SB75.

Figure 32:
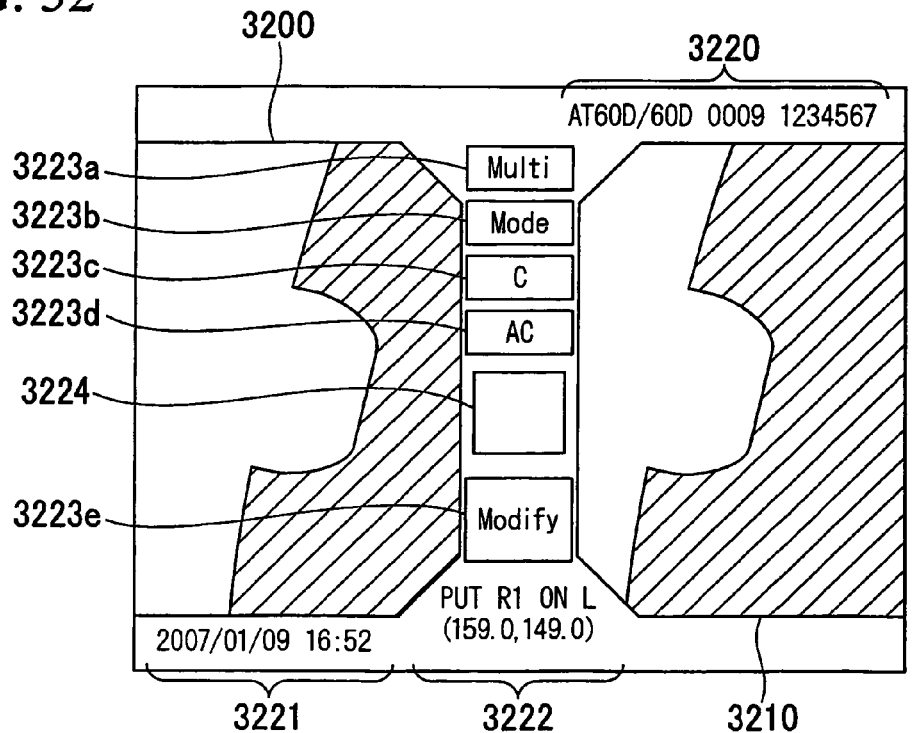
FIG. 32 shows a measurement screen prior to starting of loss measurement in the first embodiment of the present invention.

A method of displaying a measurement result according to the present embodiment will be explained in next. FIG. 32 illustrates a measurement screen prior to starting of a loss measurement. A left-object image is displayed as measurement information in a left-image 3200 and a right-object image of the measurement object is displayed in a right-image 3210. Other details, i.e., except the left-image 3200 and the right-image 3210, of measurement displayed in an upper section of the measurement screen are an optical adapter name information 3220; a date and time information 3221; icons 3223*a*, 3223*b*, 3223*c*, 3223*d*, and 3223*e*; and a zoom window 3224.

Both the optical adapter name information 3220 and the date and time information 3221 indicate measurement conditions.

The optical adapter name information 3220 literally indicates a name of a current used optical adapter. The date and time information 3221 indicates current date and time literally. The message information 3222 includes literal information that indicates operational instructions to the user; and literal information that indicates the coordinate of a measurement condition, i.e., reference point.

Icons 3223*a* to 3223*e* constitute an operation menu that allows the user to input operational instructions, e.g., switching of measurement modes, or clearing measurement results. When user operates the remote controller 4 or the PC 31 and moves a cursor (not shown) on any one of the icons 3223*a* to 3223*e* and e.g., clicking a cursor, signals that correspond to the operations is input into the measurement-processing section 18. The control section 18*a* recognizes the operational instructions input by the user based on the signals and controls the measurement processing. Also, an enlarged image of the measurement object is displayed on the zoom window 3224.

Figure 33:
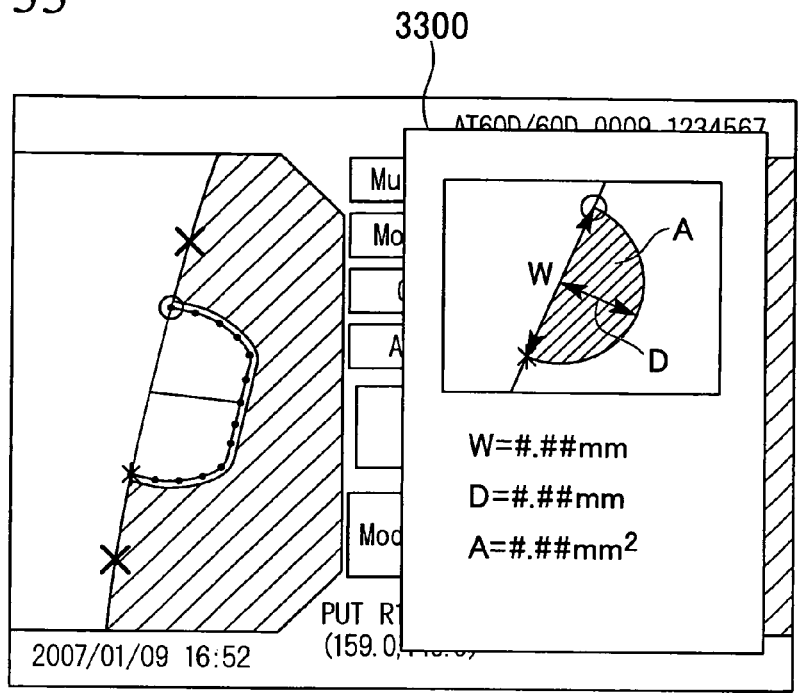
FIG. 33 shows a measurement screen while displaying the result of the loss measurement in the first embodiment of the present invention.

FIG. 33 illustrates a measurement screen when the loss measurement result is displayed. Picked up image and literal information, etc. in the right-image are hidden behind an result window 3300 since the result window 3300 that carries out displaying of measurement result overlaps on the picked up image and various information with respect to the measurement object as illustrated in FIG. 32. This state (first displaying state) is suitable for obtaining a space necessary to display measurement result and to improve visibility of the measurement result.

Figure 34:
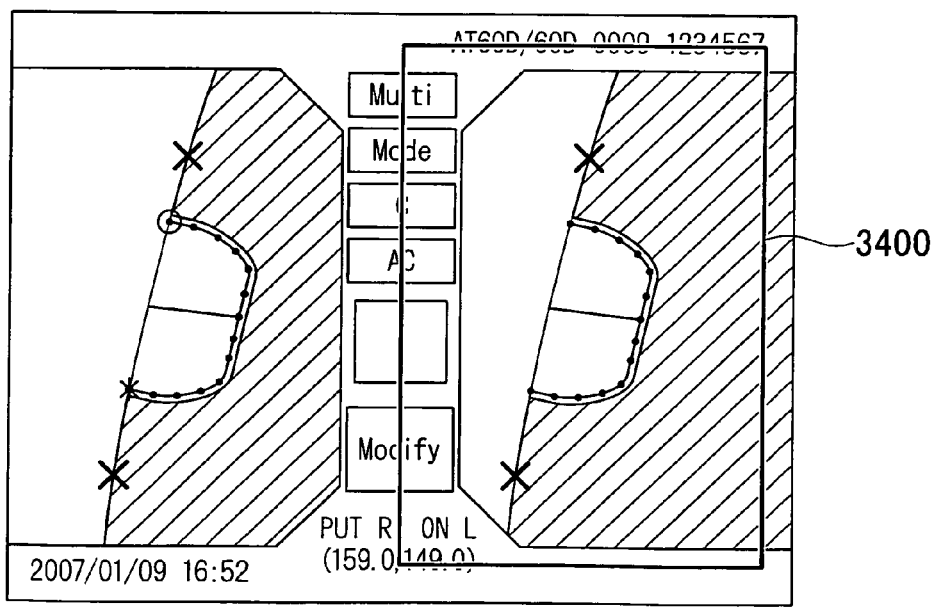
FIG. 34 shows a measurement screen while displaying the result of the loss measurement in the first embodiment of the present invention.

Operations e.g., clicking of a cursor, not shown in the drawings, and moving the cursor onto the result window 3300 conducted by the user who maneuvers the remote controller 4 or the PC 31 cause the control section 18*a* to control the measurement screen to change to a measurement screen as illustrated in FIG. 34. Transparent state of the result window 3400 and a hidden state of the measurement result visualize the picked up image and literal information in the right-image that is hidden by the result window 3300 shown in FIG. 33. Only a frame of the result window 3400 is displayed.

This state (second displaying state) is suitable for obtaining a space necessary to display measurement result, e.g., a picked-up image and to improve visibility of the measurement result. This allows observing of matching state of the loss-composing points in, e.g., the left-image and the right-images. Operations e.g., clicks conducted by the user who maneuvers the remote controller 4 or the PC 31 as illustrated in FIG. 34 cause the control section 18*a* to control the measurement screen to change to a measurement screen as shown in FIG. 33.

Figure 35:
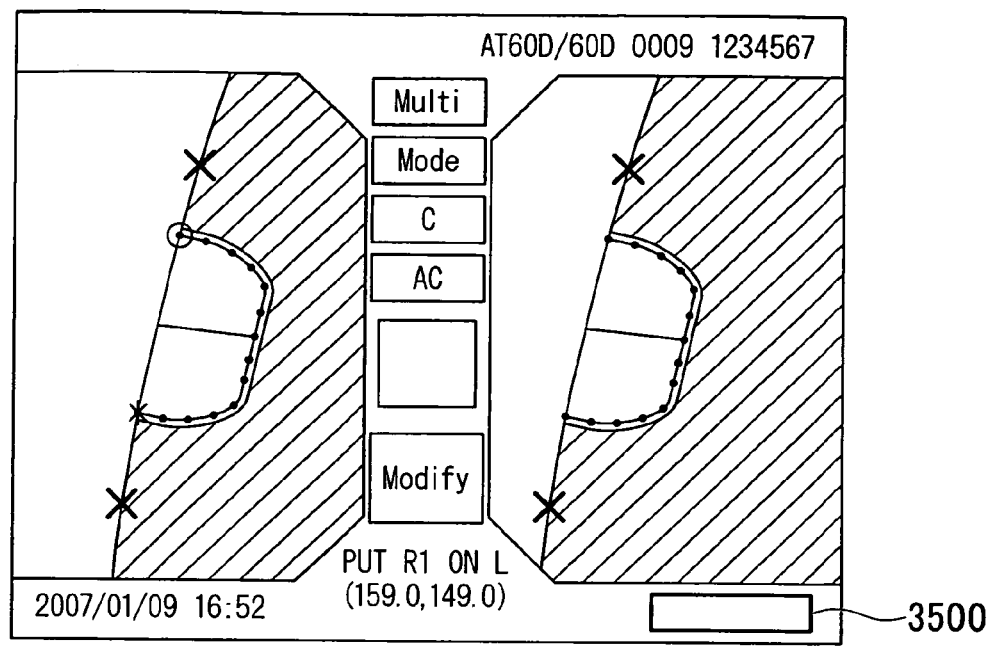
FIG. 35 shows a measurement screen while displaying the result of the loss measurement in the first embodiment of the present invention.

The measurement screen may be changed to the measurement screen as illustrated in FIG. 35 in a case where the user instructs to switch a displayed state of measurement screen as illustrated in FIG. 33. An result window 3500 as illustrated in FIG. 35 is obtained by minimizing an result window and moving a displayed position thereof so as not to prevent from displaying of other information. FIG. 35 shows a suitable state of a displayed image having a space necessary to display a measurement result, e.g., a picked-up image with improved visibility of the measurement result. Only one of the result window size and the display position may be changed, i.e., both of them may not have to be changed together unless for preventing from displaying of other information.

The present embodiment that enables measurement of loss size upon designating two reference points can reduce complex operations and improve operability more significantly than in a conventional case where three reference points, or four or more reference points are designated. Also, measurement accuracy in loss size can be improved by calculating a reference curve that is assumed to be a distortion-corrected curve that underwent distortion correction of an image-pickup optical system provided to the distal end of the electronic endoscope.

Determining of loss type based on an angle defined by two reference curves that correspond to two reference points enables automatic measurement according to the determined loss type, thereby reducing complex operations and improving operability. Parameter calculation that indicates loss size based on automatic selection of parameters corresponding to loss type allows the user who is unaware of loss type to conduct optimal automatic measurement, thereby reducing complex operations and improving operability.

Also, a problem that occurs in a conventional endoscope apparatus was lower measurement accuracy in loss size since an edge of an corner loss formed at a corner of a measurement object including an apex of an angle is approximated by a virtual curve and virtual points formed on the curve; and since selecting of the above virtual points that correspond to apices of the corner losses are conducted manually. In contrast, the present embodiment can improve measurement accuracy in loss size since a calculated cross-point between two reference curves that correspond to two reference points is assumed to be a loss-composing point (loss-apex point).

Loss size can be calculated in detail by calculating at least two types of parameters that indicate loss size.

In addition, calculating of at least two characteristic points on an edge of the measurement object and calculating a reference curve based on the calculated characteristic point can improve not only calculation accuracy in reference curve but also measurement accuracy in loss size.

In addition, the present embodiment can obtain the following effect. Conventional endoscope apparatuses had limits in size with respect to display apparatuses and monitors of the display apparatuses since movement of the apparatus must be facilitated in a site which undergoes measurement. Therefore, conventional endoscope apparatuses may be subject to lower visibility since a significant space cannot be obtained to display a picked-up image and measurement result of a measurement object.

In contrast, the present embodiment can obtain a necessary space in view of measurement information and measurement result by switching display states, between the first display state and the second display state, where the first display state displays a measurement result that overlaps on at least a part of measurement information including a picked-up image of a measurement object; the second display state visualizes the measurement information that is overlapped by the measurement result in the first display state. This can improve visibility of the measurement information and the measurement result. In addition to improved visibility, the screen of the display apparatus has a space to display not only a picked-up image of the measurement object but also literal information that indicates measurement conditions, literal information that indicates operational instructions for the user, and an operation menu for use in inputting details of operations.

First Modified Example

Modified examples of the present embodiment will be explained next. First, a first modified example will be explained. A method for calculating a reference curve based on three characteristic points will be explained as follows in contrast to calculating of a reference curve based on two characteristic points as explained above.

Figure 36:
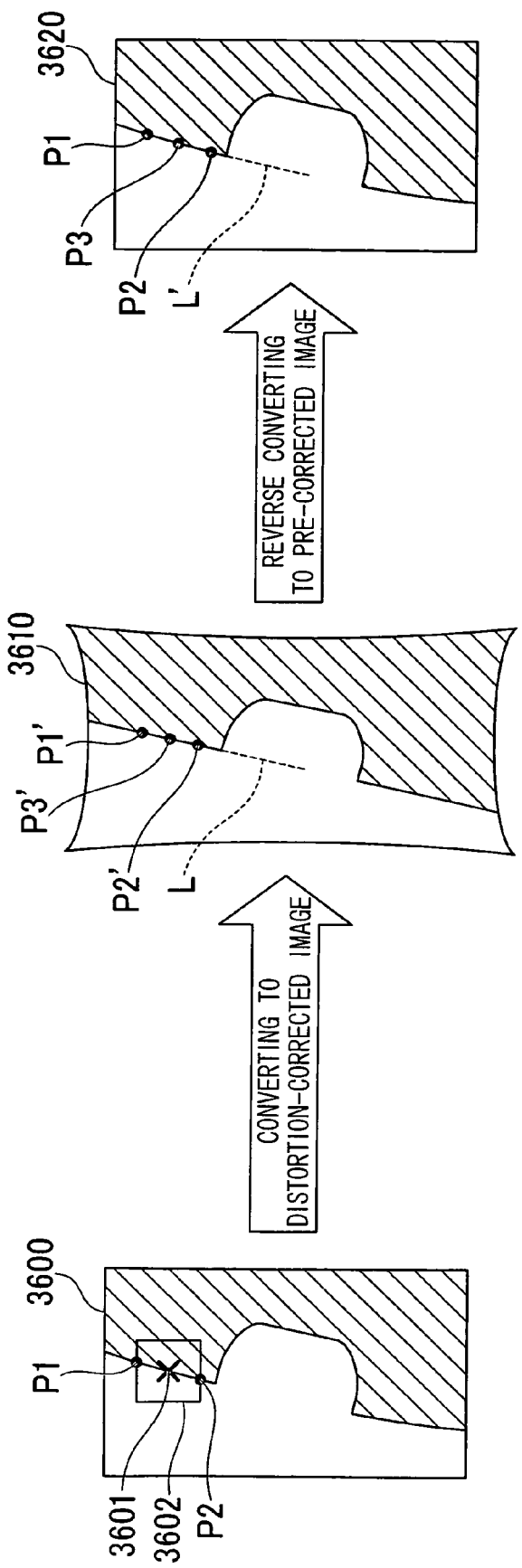
FIG. 36 shows another method of calculating a distortion-corrected curve in the first embodiment of the present invention.

As illustrated in FIG. 36, two characteristic points P1 and P2 in an original image 3600 are calculated based on positions of a reference point 3601 and a reference point region 3602. Furthermore, a third characteristic point P3 is calculated by calculating the nearest point with respect to the reference point 3601 and the edge of the measurement object. It should be noted that the characteristic point P3 in the original image 3600 is omitted in the drawings.

Converting the original image 3600 by using the optical data obtains a distortion-corrected image 3610. Points P1'P2' and P3' are post-conversion points of P1, P2, and P3 respectively. Obtaining an approximation line L by calculating a line based on e.g., a least squares method based on the points P1', P2', and P3' and reverse conversion of pixel points on the approximation line L based on optical data causes the approximation line L to be converted into a curve L' on an original image 3620. The curve L' indicates a distortion-corrected curve that passes through the points P1, P2, and P3.

Calculating a reference curve based on three characteristic points as explained above can improve calculation accuracy in the reference curve. Calculation of a reference curve may be conducted by calculating four or more characteristic points in place of the above case using three characteristic points.

It should be noted that curve approximation using quadratic function may be conducted in contrast to linear approximation conducted with respect to a distortion-corrected characteristic point as explained above. Curve approximation may provide more accurate calculation of characteristic points if the distortion-corrected edge shape is curved rather than straightened.

Second Modified Example

Next, a second modified example will be explained. As previously explained with reference to FIG. 30, a matching point of two reference points is calculated on a right-image when a spatial coordinate of a loss-apex point (three-dimensional coordinate) is calculated; the two reference curves on the right-image are calculated based on the matching point; their cross-points are assumed to be matching points of loss-apex points; and then, a spatial coordinate of the loss-apex point is calculated based on the image coordinate of the matching point. Explained as follows is a method for calculating two three-dimensional lines based on characteristic points calculated based on two reference points, and obtaining a spatial coordinate of the loss-apex point by calculating the cross-point between the two three-dimensional lines.

Figure 37:
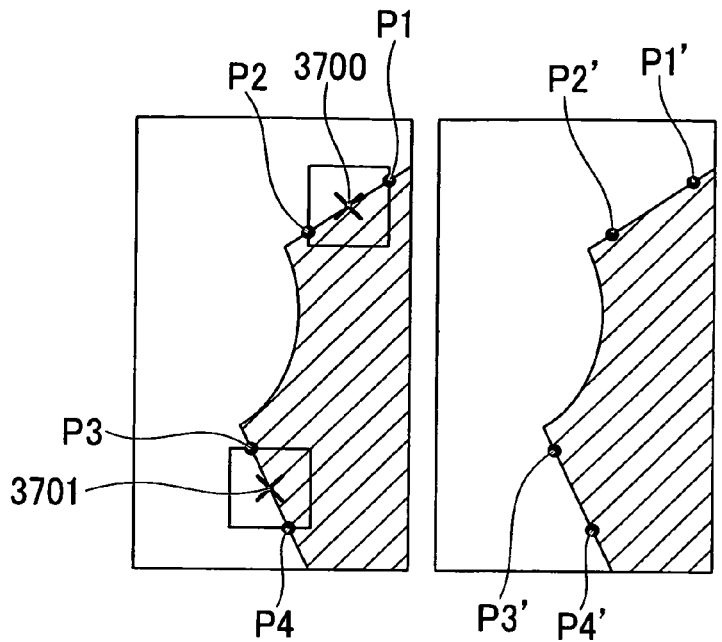
FIG. 37 shows another method of calculating a loss-apex point in the first embodiment of the present invention.

Characteristic points are first calculated based on two reference points that are designated by the user with respect to an corner loss as illustrated in FIG. 37. The characteristic points P1 and P2 are calculated based on a reference point 3700; and the points P3 and P4 are calculated based on a reference point 3701. Subsequently, matching points P1' to P4' of the points P1 to P4 are calculated, and then, spatial coordinates of the characteristic points P1 to P4 and the characteristic points P1' to P4' are calculated. In the following, a formula (1) obtains a three-dimensional line L that passes through the characteristic points P1 and P2 where (Plx, Ply) and (Clx, Cly) indicate spatial coordinates of the characteristic points P1 and P2. Similarly, a formula (2) obtains a three-dimensional line R that passes through the characteristic points P3 and P4 where (Prx, Pry) and (Crx, Cry) indicate spatial coordinates of the characteristic points P3 and P4.

$$\frac{X-Clx}{Plx-Clx} = \frac{Y-Cly}{Ply-Cly} = \frac{Z-Clz}{Plz-Clz} \qquad (1)$$

$$\frac{X-Crx}{Prx-Crx} = \frac{Y-Cry}{Pry-Cry} = \frac{Z-Crz}{Prz-Crz} \qquad (2)$$

Figure 38:
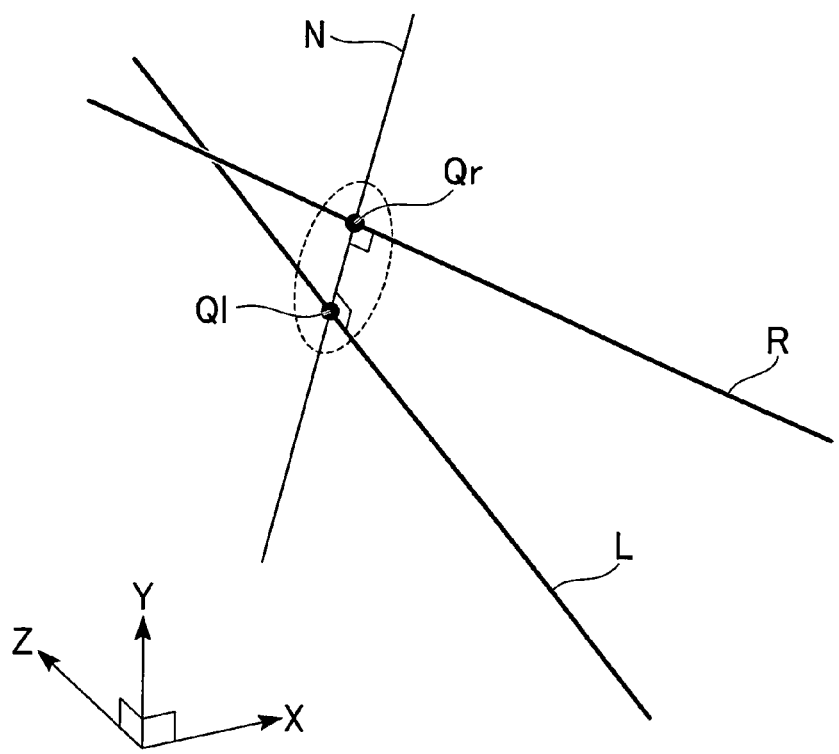
FIG. 38 shows another method of calculating a loss-apex point in the first embodiment of the present invention.

Subsequently, the cross-point between the two three-dimensional lines L and R is calculated. The present modified example assumes that a most approaching position of the two lines is the cross-point between the two lines since the three-dimensional lines L and R seldom cross each other in fact. Searching of the most approaching point of the two lines is the same as searching of a position where normals of the two lines coincide. That is, a line N that connects a most approaching point Ql on the line L to a most approaching point Qr on the line R is orthogonal to the lines L and R as illustrated in FIG. 38. Therefore, an inner product calculated based on the directional vectors of the lines L and R and the directional vector of the line N is zero. The following formulae (3) and (4) indicate these vectors.

$$(Plx-Clx,Ply-Cly,Plz-Clz)\cdot(Qlx-Qrx,Qly-Qry,Qlz-Qrz)=0 \qquad (3)$$

$$(Prx-Crx,Pry-Cry,Prz-Crz)\cdot(Qlx-Qrx,Qly-Qry,Qlz-Qrz)=0 \qquad (4)$$

The following formulae (5) and (6) using the formula (1), the formula (2), and constants s and t, stand effective since the most approaching points Ql and Qr are on the lines L and R respectively.

$$\frac{Qlx-Clx}{Plx-Clx} = \frac{Qly-Cly}{Ply-Cly} = \frac{Qlz-Clz}{Plz-Clz} = s \qquad (5)$$

$$\frac{Qrx-Crx}{Prx-Crx} = \frac{Qry-Cry}{Pry-Cry} = \frac{Qrz-Crz}{Prz-Crz} = t \qquad (6)$$

Subsequently, the spatial coordinates of the most approaching points Ql and Qr are calculated by using the above formulae (1) to (6). First, the formulae (7) and (8) define constants tmp1, tmp2, tmp3, tmp4, tmp5, and tmp6 as follows.

$$tmp1=Plx-Clx, tmp2=Ply-Cly, tmp3=Plz-Clz, \qquad (7)$$

$$tmp4=Prx-Crx, tmp5=Pry-Cry, tmp6=Prz-Crz, \qquad (8)$$

Converting the formulae (3) and (4) by using the constants tmp1 to tmp6 obtains formula (3a) and formula (4a) as follows.

$$(tmp1,tmp2,tmp3)\cdot(Qlx-Qrx,Qly-Qry,Qlz-Qrz)=0 \qquad (3a)$$

$$(tmp4,tmp5,tmp6)\cdot(Qlx-Qrx,Qly-Qry,Qlz-Qrz)=0 \qquad (4a)$$

Converting the formulae (5) and (6) by using the constants tmp1 to tmp6 obtains formula (5a) and formula (6a) as follows.

$$Qlx=tmp1*s+Clx, Qly=tmp2*s+Cly, Qlz=tmp3*s+Clz, \qquad (5a)$$

$$Qrx=tmp4*t+Crx, Qry=tmp5*t+Cry, Qrz=tmp6*t+Crz, \qquad (6a)$$

Subsequently, converting the formula (3a) and (4a) by using the formulae (5a) and (6a) obtains formula (3b) and (4b) as follows.

$$(tmp1,tmp2,tmp3)\cdot(tmp1*s-tmp4*t+Clx-Crx,tmp2*s-tmp5*t+Cly-Cry,tmp3*s-tmp6*t+Clz-Crz)=0 \qquad (3b)$$

$$(tmp4,tmp5,tmp6)\cdot(tmp1*s-tmp4*t+Clx-Crx,tmp2*s-tmp5*t+Cly-Cry,tmp3*s-tmp6*t+Clz-Crz)=0 \qquad (4b)$$

Furthermore, formulae (3c) and (4c) are obtained by rearranging the formulae (3b) and (4b) as follows.

$$(tmp1^2+tmp2^2+tmp3^2)*s - \\ (tmp1*tmp4+tmp2*tmp5+tmp3*tmp6)*t + \\ (Clx-Crx)*tmp1+(Cly-Cry)*tmp2+(Clz-Crz)*tmp3=0 \qquad (3c)$$

$$(tmp1*tmp4+tmp2*tmp5+tmp3*tmp6)*s - \\ (tmp4^2+tmp5^2+tmp6^2)*t+(Clx-Crx)*tmp4 + \\ (Cly-Cry)*tmp5+(Clz-Crz)*tmp6=0 \qquad (4c)$$

The following formulae (9) to (14) define constants al, bl, cl, ar, br, and cr.

$$al=tmp1^2+tmp2^2+tmp3^2 \qquad (9)$$

$$bl=tmp1*tmp4+tmp2*tmp5+tmp3*tmp6 \qquad (10)$$

$$cl=(Clx-Crx)*tmp1+(Cly-Cry)*tmp2+(Clz-Crz)*tmp3 \qquad (11)$$

$$ar=bl=tmp1*tmp4+tmp2*tmp5+tmp3*tmp6 \qquad (12)$$

$$br=tmp4^2+tmp5^2+tmp6^2 \qquad (13)$$

$$cr=(Clx-Crx)*tmp4+(Cly-Cry)*tmp5+(Clz-Crz)*tmp6 \qquad (14)$$

Organizing the formulae (3c) and (4c) by using the formulae (9) to (14) obtains the following formulae (3d) and (4d).

$$al*s-bl*t+cl=0 \qquad (3d)$$

$$ar*s-br*t+cr=0 \qquad (4d)$$

The following formulae (15) and (16) stand effective based on the formulae (3d) and (4d).

$$\therefore s = \frac{-br*cl+bl*cr}{al*br-ar*bl} \qquad (15)$$

$$\therefore t = \frac{-ar*cl+al*cr}{al*br-ar*bl} \qquad (16)$$

On the other hand, coordinates of the most approaching points Ql and Qr are indicated by using the formulae (5) to (8) with the following formulae (17) and (18). Substituting the formulae (7) to (18) into the formulae (17) and (18) obtains the coordinates of the most approaching points Ql and Qr.

$$Qlx=tmp1*s+Clx, Qly=tmp2*s+Cly, Qlz=tmp1*s+Clz, \qquad (17)$$

$$Qrx=tmp4*t+Crx, Qry=tmp5*t+Cry, Qrz=tmp6*t+Crz, \qquad (18)$$

Finally, the following formula (19) indicates the spatial coordinate of the loss-apex point by assuming that the midpoint between the most approaching points Ql and Qr is the cross-point between the lines L and R. Similarly to the above method, the spatial coordinate of the loss-apex point in the right-image can be calculated based on the spatial coordinates of the characteristic points P1' to P4'.

$$\left(\frac{Qlx+Qrx}{2}, \frac{Qly+Qry}{2}, \frac{Qlz+Qrz}{2}\right) \quad (19)$$

Third Modified Example

Next, a third modified example will be explained. The previous explanations are based on assumption that the selected reference points free of a loss are positioned across a loss. However, sometimes the points on the edge free from a loss are difficult to be selected as reference points in a case where the loss is disposed near an end of the picked up image. A method for implementing loss measurement based on a loss end point as a reference point will be explained as follows.

Figure 39:
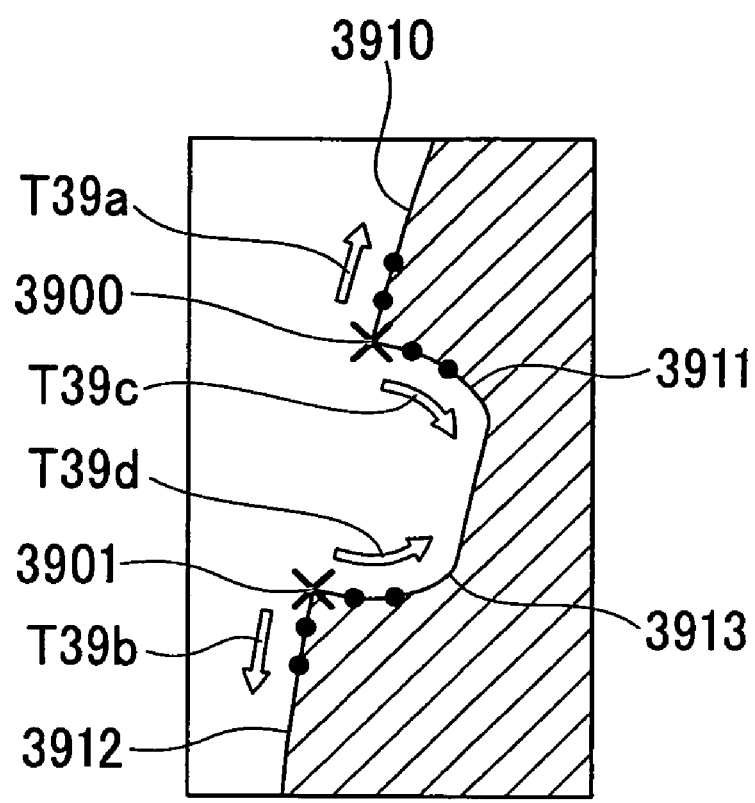
FIG. 39 shows another method of calculating a reference point in the first embodiment of the present invention.

As illustrated in FIG. 39, reference points 3900 and 3901 designated by the user are two end points of the loss. The reference point 3900 is located at the cross-point between an edge 3910 of the measurement object near the loss and an edge 3911 of the loss. Also, the reference point 3901 is located at the cross-point between an edge 3912 of the measurement object near the loss and an edge 3913 of the loss.

The characteristic points for use in calculating the reference curves in the loss calculation are searched from the reference point 3900 in a direction T39a and from the reference point 3901 in a direction T39a. The characteristic points for use in calculating the loss-composing points are searched from the reference point 3900 in a direction T39c and from the reference point 3901 in a direction T39d. The directions T39a, T39b, T39c, and T39d can be distinguished based on correlation of the reference points 3900 and 3901 with characteristic points or measurement points.

Calculation of the characteristic points finishes when the necessary number of characteristic points are calculated. In addition, as far as calculation of the measurement points is concerned, the calculation of the measurement points finishes when the two-dimensional distance between a measurement point searched from the reference point 3900 and a measurement point searched from the reference point 3901 is a predetermined value or smaller after starting search of measurement points from the reference point 3900 and the reference point 3901.

As previously explained, loss measurement can be conducted regardless of the position of a loss in a picked up image as long as the full image of the loss is picked up since the end point of the loss can be designated as a reference point. In addition, complex operations can be reduced and operability can be improved since it is not necessary to change an image-pickup position to pick up another image to designate a reference point.

Fourth Modified Example

Next, a fourth modified example will be explained. Measurement objects in the fourth modified example are, burning (scorching) formed on a blade surface, peeling of paint, or rust in a pipe, etc., in contrast to the aforementioned explanations concerning the primary object of specifying losses formed on a turbine blade edge or a compressor blade edge.

Figure 40C:
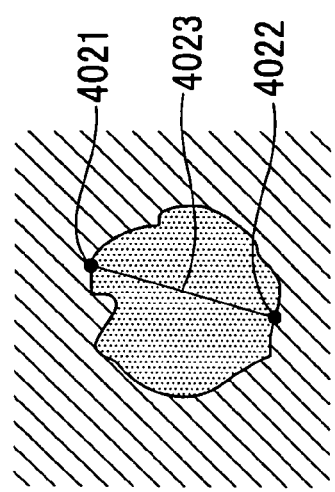
FIGS. 40A to 40C show a measurement object in the first embodiment of the present invention.
Figure 40B:
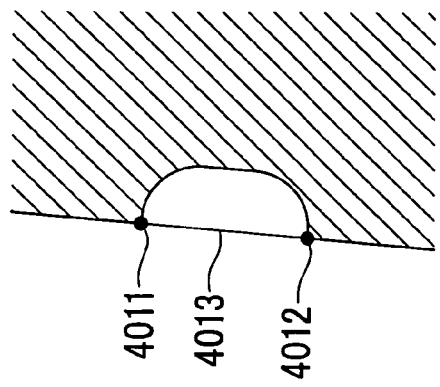
Figure 40A:
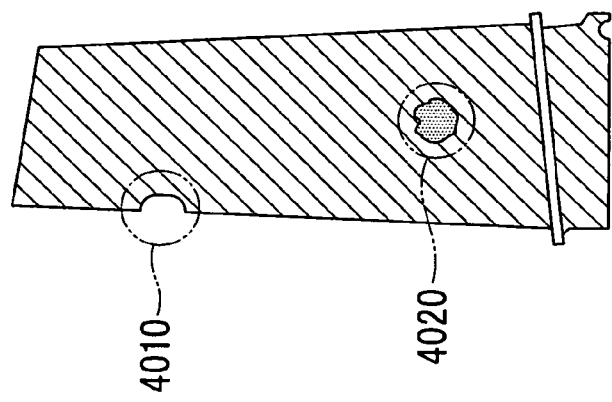

For example, a compressor blade 4000 shown in FIG. 40A has a loss 4010 formed on an edge and a burning 4020 on the surface thereof. FIG. 40B shows an enlarged view of the loss 4010, and FIG. 40C shows an enlarged view of the burning 4020. The loss 4010 has an edge on a single side relative to a line 4013 connecting the end points 4011 and 4012. In contrast, the burning 4020 has two edges relative to a line 4023 connecting arbitrary points 4021, and 4022 on an outline (edge) around the burning 4020.

Figure 41A:
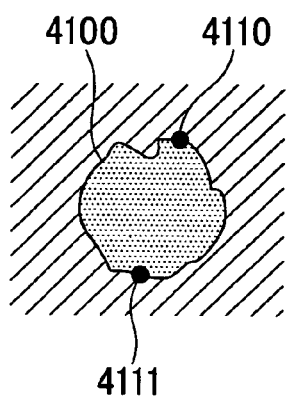
FIGS. 41A to 41E show a procedure of loss measurement in the first embodiment of the present invention.
Figure 41B:
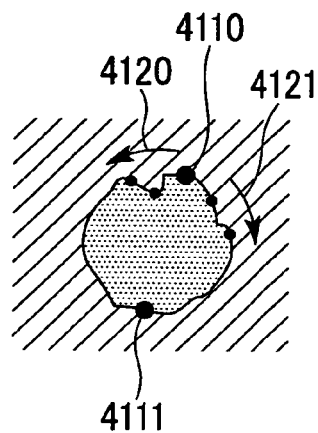

A method for conducting loss measurement will be explained with reference to FIGS. 41A to 41E as follows with respect to a measurement object that has edges on both sides of a line connecting two arbitrary points on the measurement object. First, the user designates two arbitrary reference points 4110 and 4111 on an edge of the burning 4100 as illustrated in FIG. 41A. Sequential search subsequently conducted to the points between the two designated reference points positioned on the edge provides loss-composing points (measurement points) as aforementioned in the first embodiment. Subsequently, the loss-composing points are searched in two directions indicated by arrows 4120 and 4121 from the reference point 4110 to the reference point 4111 as illustrated in FIG. 41B. The reference points 4110 and 4111 are just registered for a loss-start point and a loss-end point respectively in the present modified example, which does not calculate a reference curve.

Figure 41C:
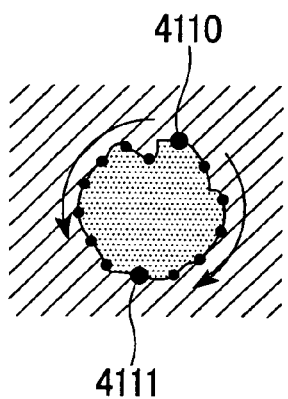
Figure 41D:
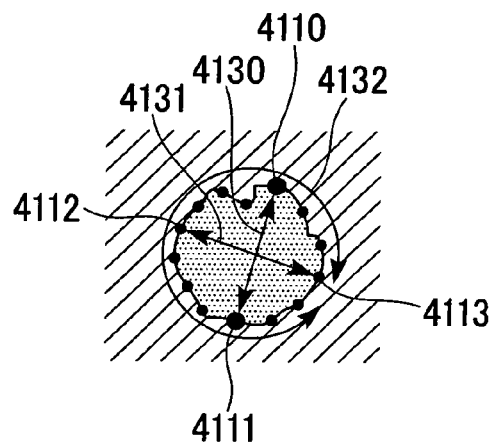

The searching of the loss-composing points is completed upon obtaining the predetermined or shorter two-dimensional distance between the loss-composing points and the reference point 4111 that have undergone the searching. FIG. 41C illustrates the search of loss-composing points is completed. Subsequently, matching points corresponding to the extracted loss-composing points are calculated, and a spatial coordinate of each point is calculated. The size of the burning 4100 is calculated based on the spatial coordinate of each calculated point. The size of the calculated burning 4100 is indicated by an area and widths 4130 and 4131 and circumferential length 4132 of the burning 4100 as illustrated in FIG. 41D.

Figure 41E:
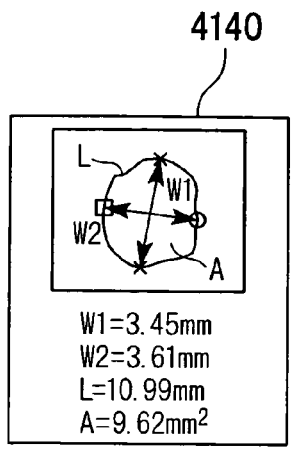

The width 4130 is a spatial distance between the reference points 4110 and 4111. The width 4131 is a spatial distance between the loss-composing points 4112 and 4113 that are the most distant in a lateral direction from a line that joins the reference points 4110 and 4111. The circumferential length 4132 is a sum of spatial distances between the two adjoining loss-composing points. The area indicates a spatial area of a region surrounded by all of the loss-composing points. The measurement screen, upon obtaining the calculated size of the burning 4100, displays the result window 4140 that indicates the measurement result as illustrated in FIG. 41E. Loss measurement is practicable to burning as explained previously.

Another Modified Example

Another modified example of the present embodiment will be explained next. Measurement objects in an modified example of the present invention are, burning (scorching) formed on a blade surface, peeling of paint, or rust in a pipe etc., in contrast to the aforementioned explanations concerning the primary object of specifying losses formed on a turbine blade edge or a compressor blade edge.

For example, a compressor blade 4000 shown in FIG. 40A has a loss 4010 formed on an edge and a burning 4020 on the surface thereof. FIG. 40B shows an enlarged view of the loss 4010, and FIG. 40C shows an enlarged view of the burning 4020. The loss 4010 has an edge on a single side relative to a line 4013 connecting the end points 4011 and 4012. In contrast, the burning 4020 has two edges relative to a line 4023 connecting arbitrary points 4021, and 4022 on an outline (edge) around the burning 4020.

A method for conducting loss measurement will be explained with reference to FIGS. 41A to 41E as follows with respect to a measurement object that has edges on both sides of a line connecting two arbitrary points on the measurement object. First, the user designates two arbitrary reference points 4110 and 4111 on an edge of the burning 4100 as illustrated in FIG. 41A. Sequential search subsequently conducted to the points between the two designated reference points positioned on the edge obtains loss-composing points (measurement points) as explained in the aforementioned embodiments. Subsequently, the loss-composing points undergo the searching in two directions indicated by arrows 4120 and 4121 from the reference point 4110 to the reference point 4111 as illustrated in FIG. 41B. The reference points 4110 and 4111 are just stored as a loss-start point and a loss-end point respectively in the fourth modified example, which does not calculate a reference curve.

The searching of the loss-composing points finishes upon obtaining the predetermined or shorter two-dimensional distance between the loss-composing points and the reference point 4111 that have undergone the searching. FIG. 41C illustrates the search of loss-composing points are completed. Subsequently, matching points corresponding to the extracted loss-composing points are calculated, and a spatial coordinate of each point is calculated. The size of the burning 4100 is calculated based on the spatial coordinate of each calculated point. The size of the calculated burning 4100 is indicated by an area based on the product of widths 4130 and 4131 and circumferential length 4132 of the burning 4100 as illustrated in FIG. 41D.

The width 4130 is a spatial distance between the reference points 4110 and 4111. The width 4131 is a spatial distance between the loss-composing points 4112 and 4113 that are the most distant in a lateral direction from a line that joins the reference points 4110 and 4111. The circumferential length 4132 is a sum of the spatial distances between the two adjoining loss-composing points. The area indicates a spatial area of a region surrounded by all of the loss-composing points. The measurement screen, upon obtaining the calculated size of the burning 4100, displays the result window 4140 that indicates the measurement result as illustrated in FIG. 41E. Loss measurement is practicable to burning as explained previously.

Designating a point on an edge in the present embodiment enables detection and measurement of a burning.

A method for measuring a burning in the present embodiment will be explained as follows.

Figure 42A:
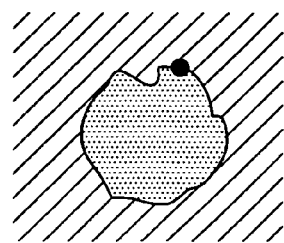
FIGS. 42A to 42E show a method of measuring a burning.

First, a reference point is designated on an edge of a burning as illustrated in FIG. 42A.

Figure 42B:
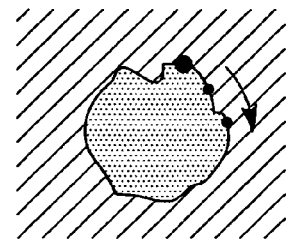

Subsequently, the loss-composing points are searched in a clockwise direction from the reference point as illustrated in FIG. 42B. The sequential search may be conducted in a counter-clockwise direction in this case.

Figure 42C:
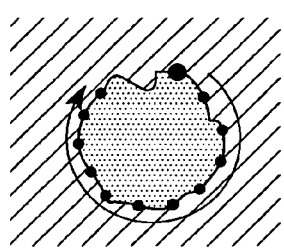

The searching terminates upon obtaining a predetermined two-dimensional distance or shorter between the searched loss-composing point and the reference point as illustrated in FIG. 42C.

Figure 42D:
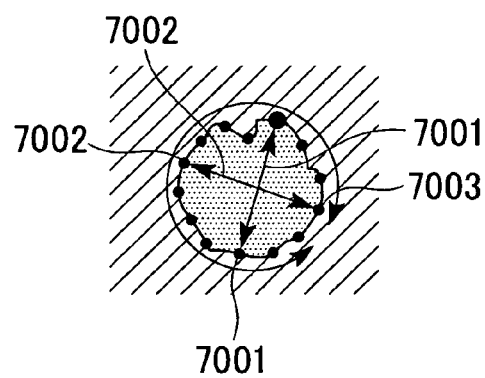

A process of pattern-matching is based on the extracted loss-composing points as illustrated in FIG. 42D, and then three-dimensional width 7001, width 7002, circumferential length 4132, and area of the burning are calculated.

This state of width 7001 indicates the three-dimensional distance between the reference point and the loss-composing point P7001 having the longest two-dimensional distance from the reference point.

In addition, the width 7002 indicates the three-dimensional distance between the loss-composing points P7002 and P7003 that are the most distant in a lateral direction from a line that joins the reference point and the aforementioned loss-composing points P7001.

Figure 42E:
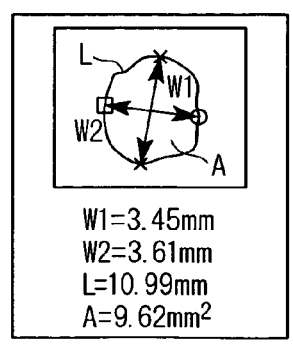

The process terminates upon displaying the calculated measurement result on the measurement screen as illustrated in FIG. 42E.

The embodiments and modified examples of the present invention have been explained above in detail with reference to the drawings. However, it should be understood that the drawings and detailed description thereto are not intended to limit the invention to the particular form disclosed; thus, the invention disclosed herein is capable of having various modifications and alternative forms, i.e., design changes.

What is claimed is:

1. An endoscope apparatus comprising:
    an electronic endoscope for capturing a measurement object and producing a picked-up image signal;
    an image-processing unit for producing an image signal based on the picked-up image signal; and
    a measurement processing unit for conducting a measurement processing on the measurement object based on the image signal,
    wherein the measurement processing unit comprises:
        a reference point-designating unit for designating two reference points on the measurement object;
        a loss-composing points-calculating unit for calculating loss-composing points that constitute a loss outline formed on the measurement object based on the two reference points;
        a loss-measurement unit for measuring a loss size based on the loss-composing points; and
        an approximate-outline-calculating unit for calculating two approximate outlines calculated by approximating an outline of the measurement object based on the two reference points;
        wherein the loss-composing points-calculating unit calculates the loss-composing points based on the two reference points and the two approximate outlines; and
        wherein the reference point-designating unit designates end points as the two reference points on cross-points between the outline of the measurement object and the loss outline.

2. The endoscope apparatus according to claim 1, wherein the approximate-outline-calculating unit calculates the two approximate outlines of the measurement object by correcting distortion in an image-pickup optical system disposed at a distal end of the electronic endoscope.

3. The endoscope apparatus according to claim 1, further comprising a loss-type-identifying unit for identifying a loss type based on an angle defined by the two approximate outlines corresponding to the two reference points, wherein the loss type is a type of damage to the measurement object.

4. The endoscope apparatus according to claim 3, wherein the loss-measurement unit calculates a parameter indicative of the loss size corresponding to the loss type.

5. The endoscope apparatus according to claim 1, wherein the loss-composing points-calculating unit calculates one of the loss-composing points which indicates a cross-point between the two approximate outlines corresponding to the two reference points, when the two approximate outlines are generated along two outlines of the measurement object around a corner of the measurement object based on the two reference points generated on the two outlines of the measurement object around the corner.

6. The endoscope apparatus according to claim 1, wherein the loss-measurement unit calculates two parameter types indicative of the loss size.

7. The endoscope apparatus according to claim 1, wherein the approximate-outline-calculating unit calculates at least two characteristic points on the outline of the measurement object disposed around one of the reference points and calculates the two approximate outlines based on at least the two characteristic points.

8. The endoscope apparatus according to claim 1, wherein the loss-composing points-calculating unit calculates the loss-composing points in two directions from one of the reference points to the other one of the reference points.

* * * * *